(12) United States Patent
Jinbo et al.

(10) Patent No.: US 6,216,078 B1
(45) Date of Patent: Apr. 10, 2001

(54) ELECTRICAL OPERATING DEVICE FOR BICYCLES

(75) Inventors: Masahiko Jinbo, Minamikawachigun; Masahiko Fukuda, Amagasaki; Takeo Abe, Sakai, all of (JP)

(73) Assignee: Shimano, Inc., Osaka (JP)

( * ) Notice: Subject to any disclaimer, the term of this patent is extended or adjusted under 35 U.S.C. 154(b) by 0 days.

(21) Appl. No.: 08/991,260

(22) Filed: Dec. 16, 1997

(30) Foreign Application Priority Data

Dec. 20, 1996 (JP) .................................................. 8-354957
Aug. 26, 1997 (JP) .................................................. 9-244758

(51) Int. Cl.[7] ............................... G06F 7/70; G06F 19/00
(52) U.S. Cl. ..................... 701/70; 188/24.11; 340/427; 340/432
(58) Field of Search ................................. 701/1, 22, 70, 701/71; 180/220, 221, 65.1, 65.2; 280/208, 209; 188/24.11, 24.12; 74/551.1; 340/432, 427

(56) References Cited

U.S. PATENT DOCUMENTS

| | | | |
|---|---|---|---|
| 3,921,745 | * 11/1975 | McCulloch et al. | 180/205 |
| 4,044,852 | * 8/1977 | Lewis et al. | 180/206 |
| 4,071,892 | 1/1978 | Genzling | 364/424 |
| 4,859,984 | 8/1989 | Romano | 340/432 |
| 5,479,776 | * 1/1996 | Romano | 74/502.2 |
| 5,662,187 | * 9/1997 | McGovern | 180/205 |
| 5,732,598 | * 3/1998 | Shoge et al. | 74/473.13 |
| 5,775,168 | * 7/1998 | Furuta | 74/489 |
| 5,842,535 | * 12/1998 | Dennis | 180/205 |

* cited by examiner

Primary Examiner—William A. Cuchlinski, Jr.
Assistant Examiner—Gertrude Arthur
(74) Attorney, Agent, or Firm—James A. Deland

(57) ABSTRACT

An electrical operating device for a bicycle includes a brake control device adapted to be mounted to a handlebar of the bicycle and a switching device integrated with the brake control device. The brake control device includes a first operating member that moves along a first path for controlling the operation of a brake, and the switching device outputs electrical signals in response to movement of the switching device along a second path different from the first path.

41 Claims, 21 Drawing Sheets

ELECTRICAL OPERATING DEVICE FOR BICYCLES

BACKGROUND OF THE INVENTION

The present invention is directed to an electrical operating device for bicycles and, more particularly, to an electrical operating device for bicycles in which the braking lever is endowed with a rotational motion in a direction different from that of braking, and electric commands generated by this rotation control shifting, switch the indications on the speedometer, and the like.

The handlebar of a bicycle is equipped with shifting devices in addition to the braking levers for braking the bicycle. The applicant has already proposed in Japanese Laid-Open Patent Application 2-225191 a bicycle operating device in which such shifting devices are integrated with the braking lever body to allow braking and shifting to be accomplished by the same operating lever. In such a bicycle operating device, one end of the brake cable is connected to a rocking body. A rotary body to which one end of a derailleur wire is connected is supported on this rocking body, and the rotary body is provided with an operating lever. Operating the operating lever turns the rocking body and pulls the brake wire to achieve braking action. On the other hand, during shifting the operating lever is rotated around the axis of rotation orthogonal to the rocking axis, the rotary body is rotatably driven, and the derailleur wire is pulled to achieve a shifting action. Consequently, the turning of the rocking body by the operating lever contributes to braking, and, similarly, the rotation of the rotary body by the operating lever contributes to shifting.

In the combined brake and shifting device described above, the rotary body must be acted upon with the strong torque necessary to pull the derailleur wire, which is subjected to considerable tension. However, shifting devices which are constructed to provide increased levels of convenience and to possess multistep shifting capabilities as bicycles become more sporty should exert minimal tension on derailleur wires. Unfortunately, it is difficult to lower the tension in a derailleur wire below a certain level with a mechanical shifting mechanism, and certain limitations exist. To overcome such limitations, automated shifting control devices have been developed as described in U.S. Pat. No. 5,357,177 and Japanese Laid-Open Patent Application 8-113181. Such automatic shifting devices commonly comprise braking devices and shifting devices placed at a distance from each other, so quick operation is not possible.

Meanwhile, manual shifters are provided with displays for displaying the gear positions as shown in Japanese Laid-Open Patent Application 63-90490. Unfortunately, operability is inadequate because such displays are positioned at a distance from the braking devices.

Numerous proposals have also been made in recent years for mounting miniature computers and liquid-crystal displays on bicycles in order to display bicycle speed, distance traveled, time, rider's pulse, and the like as shown in Japanese Laid-Open Patent Application 62-11871. All these types of information cannot be displayed simultaneously, so the required information is displayed by the switching of the display mode with a display mode switch. This display mode switch ordinarily is mounted on the computer, thus requiring the rider to remove his or her hands from the shifting or braking device to change display modes. According to an arrangement disclosed in U.S. Pat. No. 4,071,892, a push-button switch for switching the display mode is installed on the bracket of the braking lever. However, because this button switch is located at a distance from the braking lever, the rider must operate the button by moving his or her hand from the operating position of the brake.

SUMMARY OF THE INVENTION

The present invention is directed to an electrical operating device for bicycles that is capable of performing both a braking and/or shifting operation as well as an electrical switching operation with a relatively simple structure that is easy to operate. The electrical switching operation could be, for example, the simple identification of the currently selected gear of a bicycle transmission, the selection of display modes in a bicycle computer, or the generation of the actual commands used by an electronically controlled shiftng device to shift the bicycle transmission.

In one embodiment of the present invention, an electrical operating device for a bicycle includes a brake control device adapted to be mounted to a handlebar of the bicycle and a switching device integrated with the brake control device. The brake control device includes a first operating member that moves along a first path for controlling the operation of a brake, and the switching device outputs electrical signals in response to movement of the switching device along a second path different from the first path. If desired, the first operating member comprises a first operating lever that is structured for moving along the first path, wherein the first operating lever forms part of the switching device and is structured for moving along the second path.

In a more specific embodiment, the first operating lever is coupled to a brake rotary body that is mounted to the brake control device for rotation around a first axis, wherein rotation of the brake rotary body around the first axis controls the operation of the brake. The first operating lever is also mounted to the brake rotary body for movement along the second path. The switching device may include a switching mechanism mounted to the brake rotary body for rotation around a second axis in response to movement of the first operating lever along the second path; a first first side electrical contact coupled to one of the brake rotary body and the switching mechanism; a first second side electrical contact coupled to the other one of the brake rotary body and the switching mechanism for selectively contacting the first first side electrical contact in response to rotation of the switching mechanism around the second axis; and a second second side electrical contact coupled to the other one of the brake rotary body and the switching mechanism for selectively contacting the first first side electrical contact in response to rotation of the switching mechanism around the second axis.

The switching mechanism may comprise single or multiple switching rotary bodies that are controlled by the first operating lever either directly or through one-way clutches. If desired, the single or multiple switching rotary bodies may also be controlled by a second operating member such as a second operating lever either directly or through one-way clutches. To provide distinct electrical signals that may be used to identify the currently selected gear of the bicycle transmission, the first and second second side electrical contacts may be formed as a resistive path so that distinct resistance values are output depending upon which of the second side electrical contacts are contacted by the first side electrical contact.

DETAILED DESCRIPTION OF THE EMBODIMENTS

Figure 1:
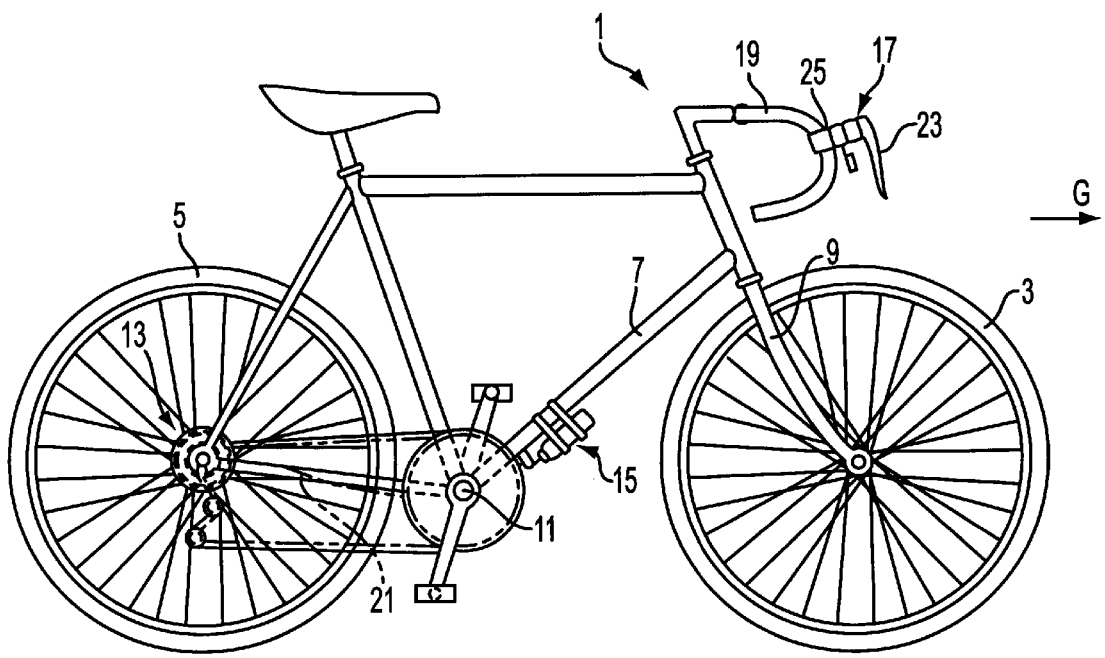
FIG. 1 is a side view of a bicycle that incorporates a particular embodiment of an electrical operating device according to the present invention.

FIG. 1 is a side view of a sport bicycle 1 that incorporates a particular embodiment of an electrical operating device according to the present invention. The bicycle 1 comprises a front wheel 3 and a rear wheel 5, which are supported by a frame 7. The rear wheel 5 is rotatably supported on the frame 7 by a rear hub, and the front wheel 3 is rotatably supported by a front hub in a front wheel fork 9 fixed to the frame 7. In the lower portion of the frame 7, a crank spindle 11 is rotatably supported by bearings and is rotatably driven by cranks. The rotation of the crank spindle 11 is transmitted to a freewheel via chainwheels, a chain, and the like. The rotation is further transmitted from the freewheel to the rear wheel 5 via a hub gear provided with a built-in shifter. These mechanisms are components of a shifting mechanism 13.

In the shifting mechanism 13, a shifting servo device 15 drives an internal shifting mechanism by means of a shifting wire 21. Basically, the shifting servo device 15 is operated by a shifting device 17 provided to a brake unit body 2 (FIG. 2) located on the drop handle 19. In this example, the shifting device 17 is attached to the curved section of the drop handle 19 mounted on the front wheel fork 9. The shifting servo device 15 comprises a servo motor (not shown), which is a drive source driven by electrical control, and a motion conversion mechanism (not shown) for converting the rotational motion of the servo motor to a rectilinear motion. In addition to the servo motor, a solenoid or the like may be used as such a drive source.

One end of the shifting wire 21 is fixed to an actuator (not shown) driven in a reciprocating fashion by the servo motor, and the other end of the shifting wire 21 is connected to the shifting mechanism 13. The shifting mechanism 13 is not described in detail herein because a commonly used means known as an internal shifting mechanism is adopted in this case without any modifications. This mechanism does not differ from a conventional mechanism in any way because the gear ratio (the ratio of the rotational speed of the crank spindle and the rotational speed of the rear wheel) is varied by a procedure in which a linear actuator (not shown) in the shifting mechanism connected to the shifting wire 21 is forced to move in a reciprocating fashion by the stretching of the unidirectionally loaded wire 21 against the loading force and by the release of the stretching force.

The shifting device 17 is provided with an operating lever 23. The operating lever 23 can be independently rotated (turned) around two mutually intersecting axes. Specifically, the operating lever 23 performs braking by rotating within the vertical plane containing the propulsion direction G of the bicycle, and it performs shifting by rotating within the plane orthogonal to this vertical plane. The handle 19 is also equipped with a holder 25 which forms the brake unit body and which is fixed to the drop handle 19.

Figure 2A:
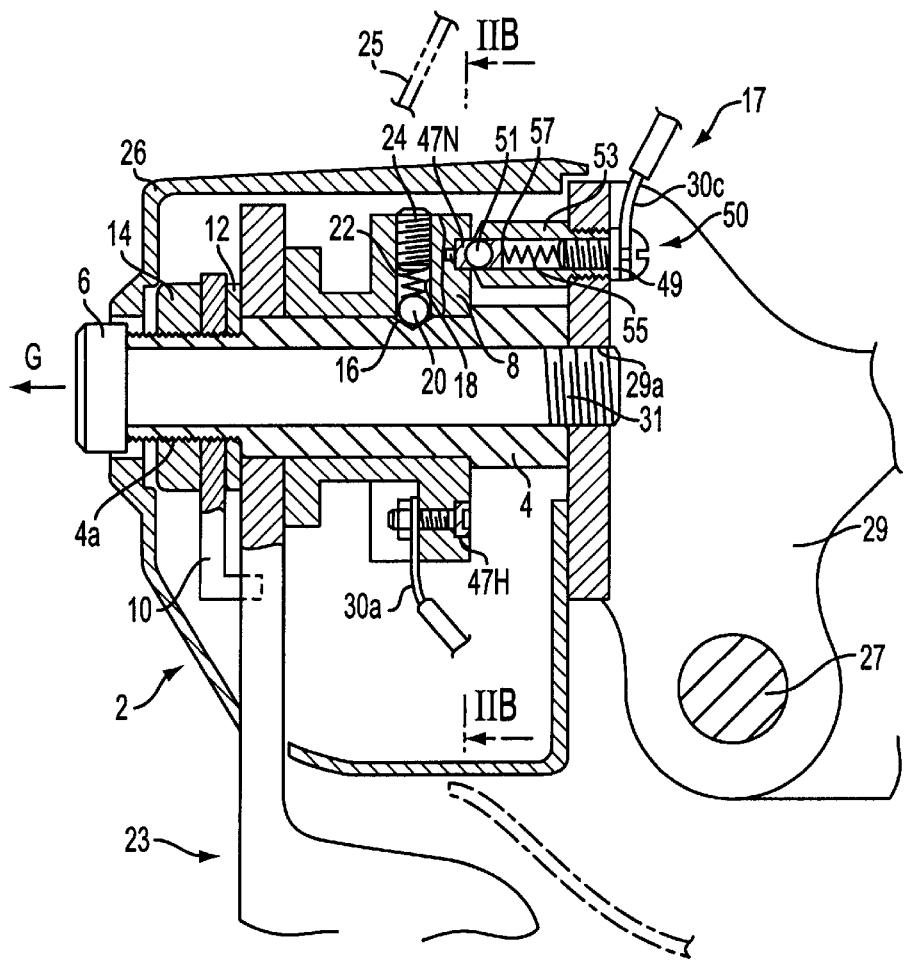
FIG. 2(a) is a partial cross-sectional view of a particular embodiment of an electrical operating device that may be used in the bicycle shown in FIG. 1.
Figure 2B:
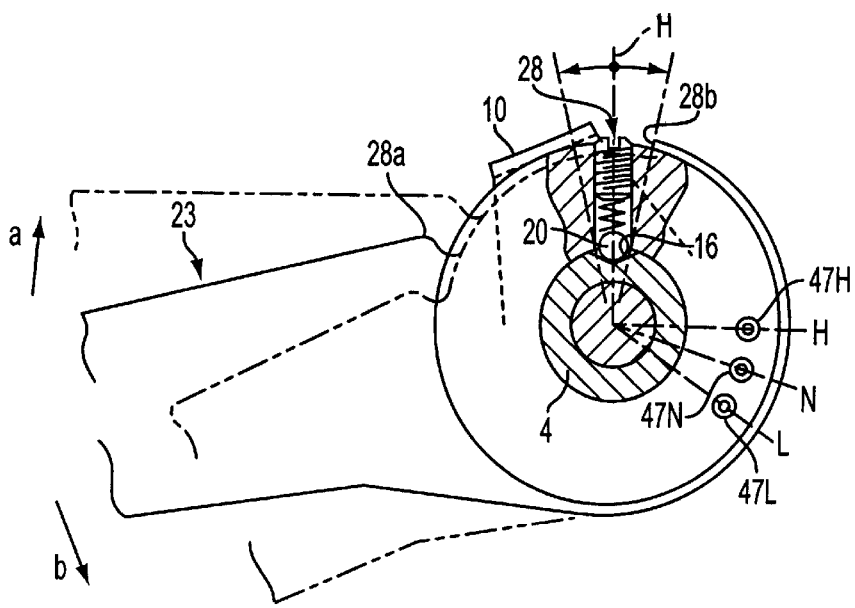
FIG. 2(b) is a view taken along line IIB—IIB in FIG. 2(a)

FIGS. 2(a) and 2(b) show a shifting device that is equipped with electric contacts and that allows braking and shifting to be performed by the same operating lever 23. For the sake of simplicity, the description will be made on the assumption that the propulsion direction G of the bicycle is the forward direction. A first rotary shaft 27 is provided in such a way that it is enclosed in the holder 25, and a first rotary body 29 is attached to the first rotary shaft 27 while allowed to rotate (turn) orthogonally. A screw hole 29a is formed in the front end face of the first rotary body 29, and a bolt 31 is threadably inserted into this screw hole 29a. The bolt 31 is inserted into a hollow stepped sleeve 4 (fixed shaft), and the stepped sleeve 4 is fixed to the first rotary body. The front end of the stepped sleeve 4 is firmly pressed and fixed by the head portion 6 of the bolt 31, and a second rotary body 8, which is made of an insulating material, is rotatably supported while pressed against the stepped portion in the middle part of the stepped sleeve 4. The operating lever 23 is fixed to the front end of the second rotary body 8, which is shaped as a disk, and these components are fixed while sandwiched between the second rotary body 8 and the stepped portion in front of the stepped sleeve 4 by fitting a spacer 12 and a stopper 10 over the threaded portion 4a at the front end of the stepped sleeve 4 and threadably tightening the nut 14. The end portion of the operating lever 23 has a circular outer periphery, and a notch 28 is formed along a portion of this periphery. The curved end portion of the stopper 10 faces the notch 28.

A radial through hole 18 is formed in the back of the second rotary body 8, and a shallow conical groove 16 is formed around the outside of the middle portion of the stepped sleeve 4 in the position corresponding to the aforementioned through hole 18. A steel ball 20 is placed in the shallow conical groove 16 via the through hole 18, a compression spring 22 is inserted into the through hole 18 and pressed against the steel ball 16, and a screw 24 is then installed to hold the steel ball 16 in such a way that it is pressure-loaded against the tapered surface inside the shallow groove 16. In this state, the second rotary body 8 is kept in the initial position, that is, in the position corresponding to the maximum depth of the shallow groove 16, as shown in FIG. 2(b).

The second rotary body 8 is equipped with a contact 47H (upshift switch) for facilitating transfer to a higher speed level, a contact 47L (downshift switch) for facilitating transfer to a lower speed level, and an insulated positioning recess 47N (initial position N) interposed between the two contacts 47H and 47L. Conductors 30a and 30b (partially shown) are connected to the two contacts 47H and 47L, respectively. Meanwhile, a fixed-side electric connector 50 is fastened to the front end face of the first rotary body 29. This fixed-side electric connector 50 is equipped with a cylinder 53 threadably fitted into the first rotary body 29. An electrode ball 51 is inserted into the cylinder 53 in such a way that part of this electrode ball 51 extends from the front end of the cylinder 53. The electrode ball 51 is pressed against a conductor washer 57, and the conductor washer 57 is loaded by a conducting spring 55 in such a way that part of the electrode ball 51 extends from the front end of the cylinder 53. A fixed-side electrode 49 in the form of a small screw is provided to the back end of the cylinder 53. One end of a conductor 30c is connected to the fixed-side electrode 49 of the fixed-side electric connector 50.

The operation of this electrical operating device will now be described with reference to FIGS. 2(a) and 2(b). First, to brake the wheels, the rider grips the handle 19 or holder 25 with his hand, places his finger on the operating lever 23, and pulls the lever toward himself. The turning of the operating lever 23 causes the first rotary body 29 to turn counterclockwise around the first rotary shaft 27, and this turning action pulls a brake wire (not shown) and creates a braking action.

A case in which shifting is performed by the servo device 15 will now be described.

Initially, the operating lever 23 is in the position shown by the solid line in FIG. 2(b). In this state, the steel ball 20 is positioned in the central bottom portion of the shallow groove 16, and the electrode ball 51 of the fixed-side electrode engages the positioning recess 47N. At this point, the fingers of the hand gripping the handle 19 or holder 25 are placed on the operating lever 23, and this lever is rotatably (turnably) displaced in the direction orthogonal to the first rotary shaft 27. The contact 47H and the fixed-side electric connector 50 come into contact when the operating lever 23 is rotated in the direction indicated by arrow (a) in FIG. 2(b).

Figure 3:
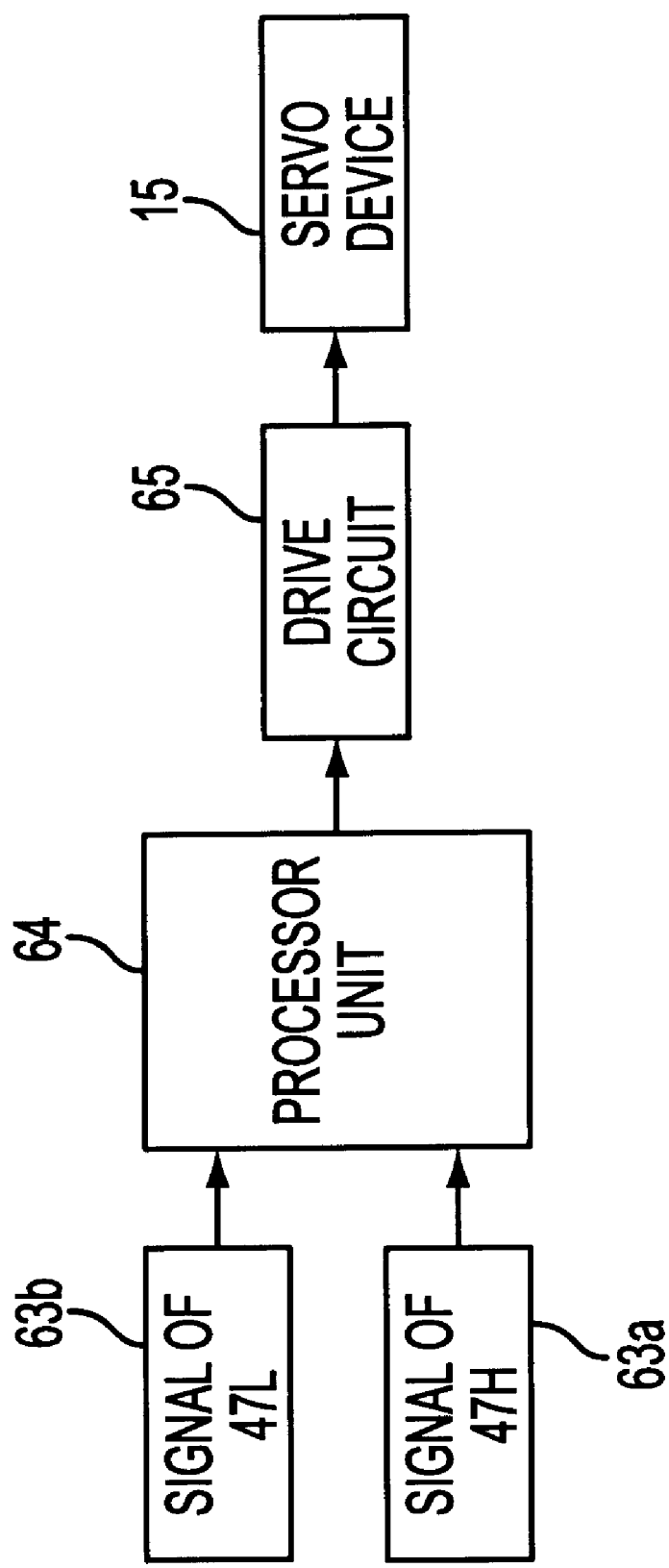
FIG. 3 is a block diagram of a particular embodiment of an electronically controlled shifting device according to the present invention.
Figure 4:
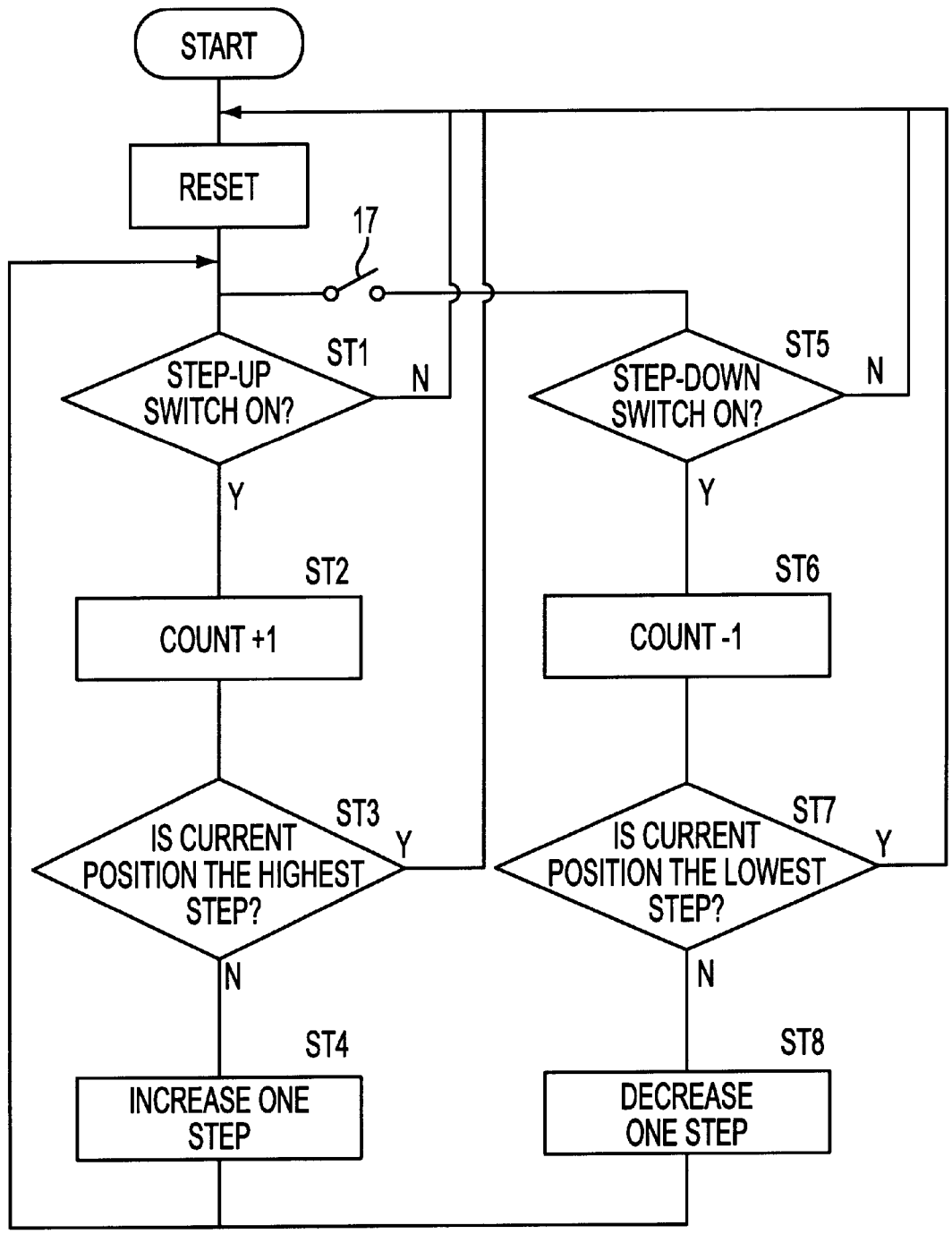
FIG. 4 is a flow chart illustrating the operation of the electronically controlled shifting device shown in FIG. 3.

As shown in the block diagram in FIG. 3, the contact between the fixed-side electric connector 50 and the contact 47H closes the drive circuit, and when a signal from the contact 47H reaches a processor unit 64, the signal type (upshift or downshift) is identified there. If it is established that this is an upshift signal, the result is inputted to a drive circuit 65 (amplifier circuit), an actuating signal is input to the servo motor 15, and the shifting mechanism 13 is switched to the upshift side. FIG. 4 is a flow chart illustrating the operation of the aforementioned processor unit 64. The processing steps shown therein will be described later on when discussing the embodiment shown in FIG. 5.

Since the second rotary body 8 rotates in the same direction as the operating lever 23, the steel ball 20 moves up the sloped surface of the shallow groove 16, and the operating lever 23 automatically returns to its initial position under the action of the loading force of the compression spring 22 when the hand is removed from the operating lever 23. As a result, the contact 47H is separated from the fixed-side electric connector 50, and the electrode ball 51 is caused to engage the positioning recess 47N. Repeating these operations sends step-up signals in a sequential manner to the shifting mechanism 13 and makes it possible to achieve the desired speed level.

When the operating lever 23 is subsequently rotated in the direction of arrow (b), contact is established between the fixed-side electric connector 50 and the contact 47L. Such a contact between the fixed-side electric connector 50 and the contact 47L closes the drive circuit and causes a signal 63b from the contact 47L to be inputted to the processor unit 64. The signal type (upshift or downshift) is identified at this point, and when it is established that the signal is a downshift signal, the result is inputted to the drive circuit 65, an actuating signal is inputted to the servo motor 15, and the shifting mechanism 13 is switched to the downshift side.

Since the steel ball 20 moves up the sloped surface of the shallow groove 16 during the operation, the operating lever 23 automatically returns to its initial position under the action of the loading force of the compression spring 22 when the hand is removed from the operating lever 23. As a result, the contact 47L shown in FIG. 2(b) is separated from the fixed-side electric connector 50, and the electrode ball 51 is caused to engage the positioning recess 47N. Repeating these operations sends step-down signals in a sequential manner to the shifting mechanism 13 and makes it possible to achieve the desired speed level.

Reciprocal switching by the operating lever 23 is controlled by ensuring contact between the stopper 10 and the limiters 28a and 28b on both sides of the notch 28 to prevent outward rotation past the connection positions of the contacts 47H and 47L.

Figure 5:
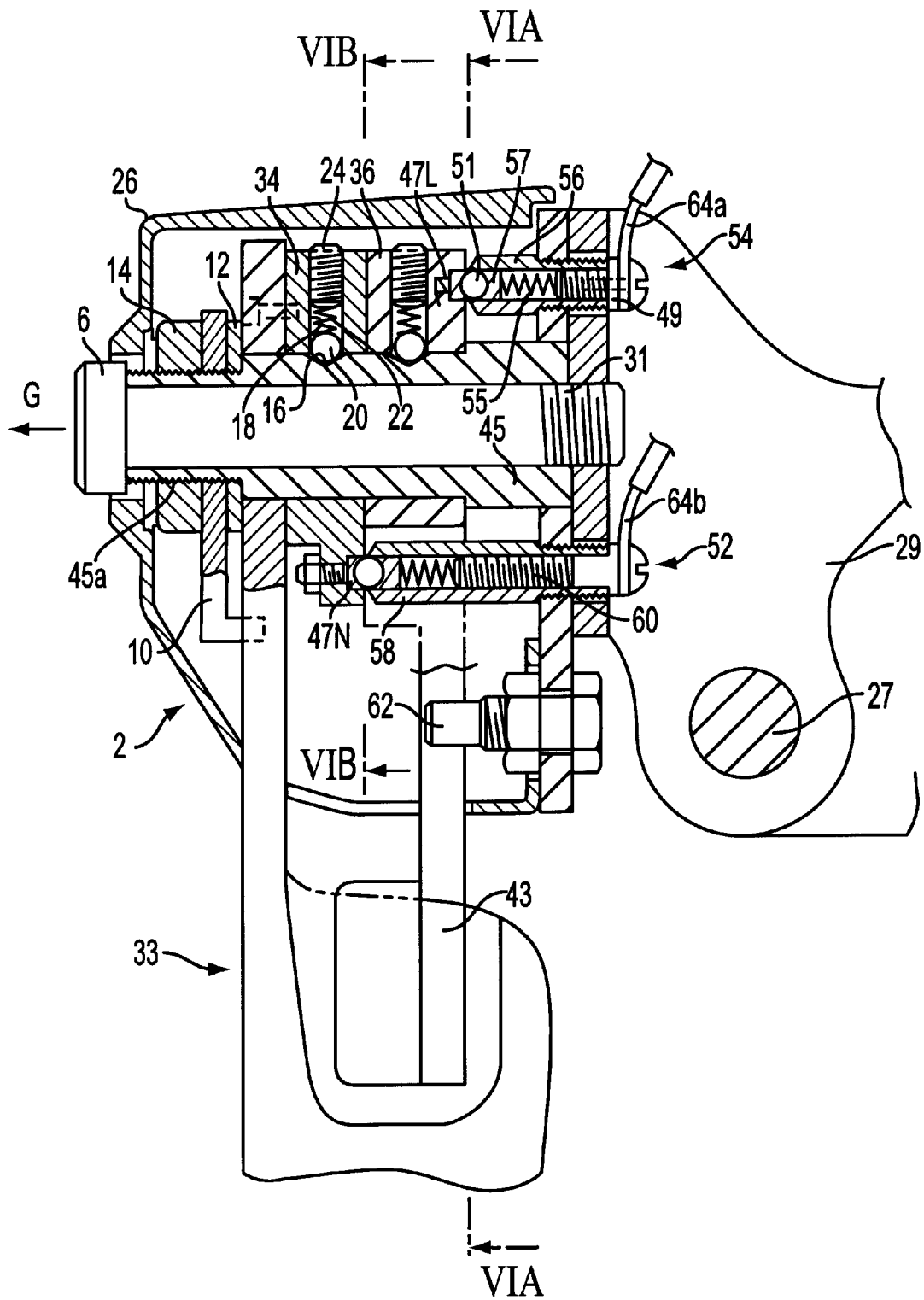
FIG. 5 is a partial cross sectional view of an alternative embodiment of an electrical operating device that may be used in the bicycle shown in FIG. 1.

FIG. 5 is a partial cross sectional view of an alternative embodiment of an electrical operating device that may be used in the bicycle shown in FIG. 1. In this embodiment, switching is performed by a shifting means provided with separate high speed contacts and low speed contacts. In the drawings, the same components as those described above are assigned the same symbols, and their detailed description is omitted.

In general, the electrical shifting device pertaining to this embodiment is rotatably installed inside the brake unit body 2 and is attached to a rotary body 29 for braking by rotation. The shifting device further includes a first switching means for outputting upshift signals designed to electrically switch the drive means to a high speed level and a second switching means for outputting downshift signals designed to electrically switch the drive means to a low speed level.

Figure 6A:
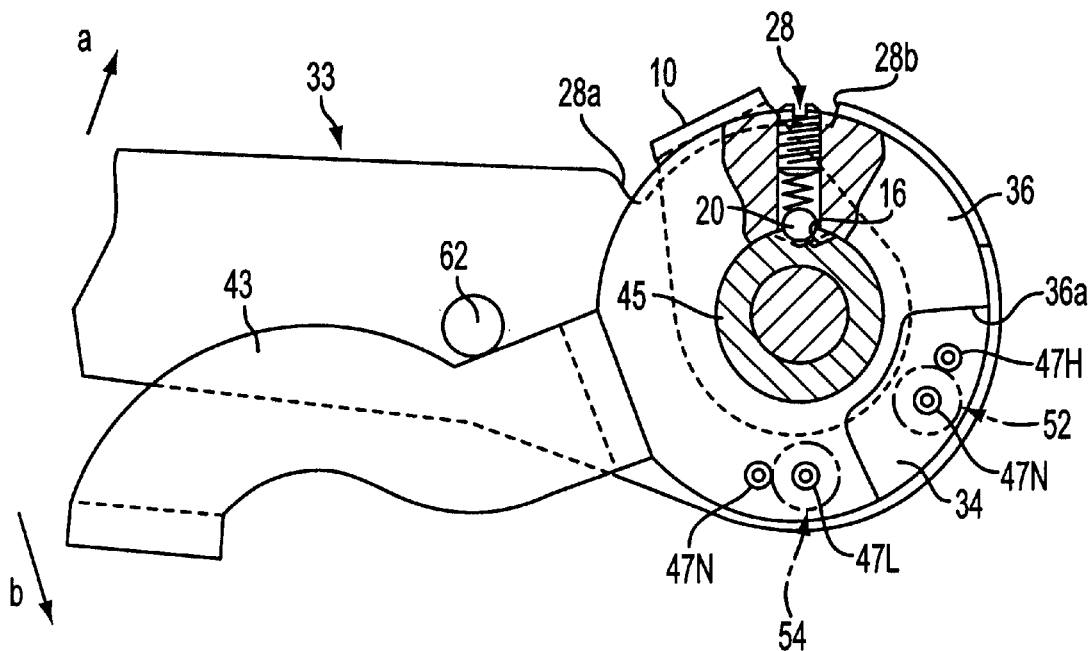
FIG. 6(a) is a view taken along line VIA—VIA in FIG. 5.

More specifically, the front end of a stepped sleeve 45 is firmly pressed and fixed by the head portion 6 of the bolt 31, and a second rotary body 34 and a third rotary body 36 are pressed against the stepped portion and rotatably supported in the middle portion of this stepped sleeve 45. A first operating lever 33 is fixed to the front end of the second rotary body 34, which is shaped as a disk, and these components are fixed by fitting a spacer 12 and a stopper 10 over the threaded portion 45a at the front end of the stepped sleeve 45 and by threadably tightening the nut 14. In the first operating lever 33, the outer periphery of the end portion thereof is shaped as a circle, a notch 28 is formed along a portion thereof, and a curved end of the stopper 10 faces this notch 28, controlling the rotation range. Similarly, a second operating lever 43 is fitted around the outside of the third rotary body 36 shaped as a disk, and a notch 36a is formed along a portion of the outer periphery of the third rotary body 36 (as shown in FIG. 6(a)) to prevent interference from a fixed-side electric connector 52 in contact with the second rotary body 34. A stopper bolt 62 is fixed in front of the first rotary body 29, and the second operating lever 43 controls inward rotation past the connection positions of the contact 47L and the fixed-side electric connector 52.

A radial through hole 18 is formed in each of the second rotary body 34 and third rotary body 36, and two axially aligned shallow conical grooves 16 are formed around the outside of the middle portion of the stepped sleeve 45 in positions corresponding to the aforementioned through holes 18 of the second and third rotary bodies 34 and 36. In the second and third rotary bodies 34 and 36, steel balls 20 are placed in the shallow conical grooves 16 via the through holes 18 of the rotary body, compression springs 22 are inserted into the through holes 18, and screws 24 are then provided so that the steel balls 20 are pressed down into the shallow grooves 16 and are kept in the loaded state. As a result, the second and third rotary bodies 34 and 36 are kept in their respective original positions.

Figure 6B:
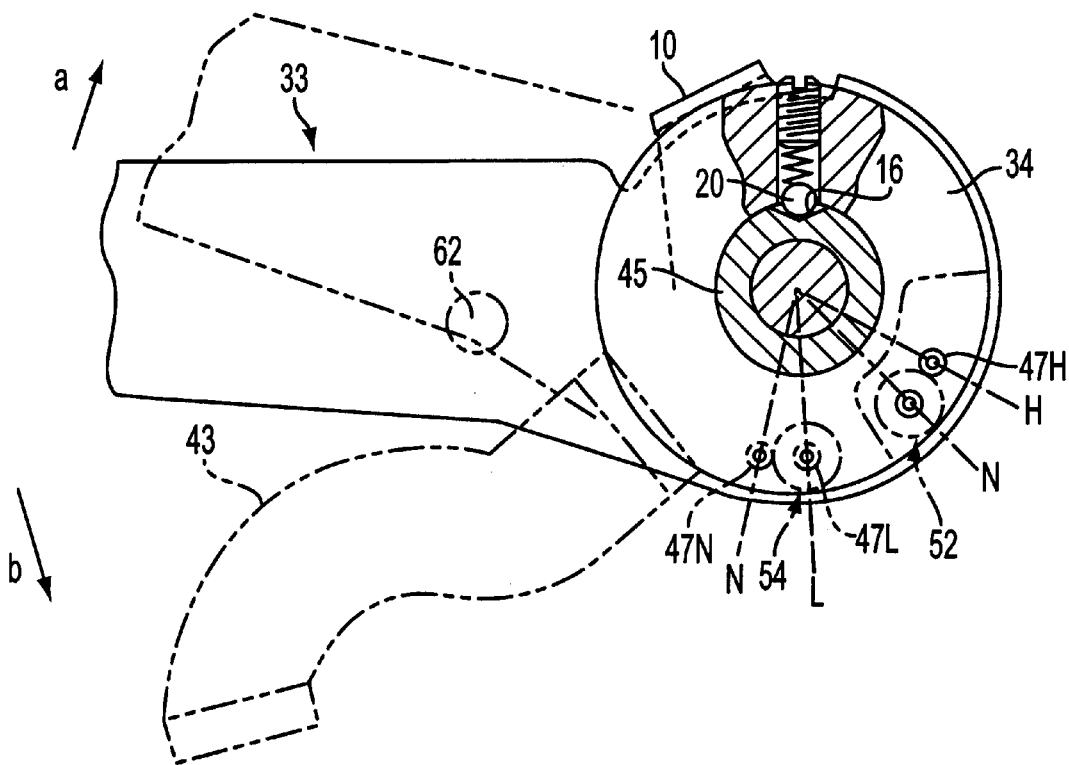
FIG. 6(b) is a view taken along line VIB—VIB in FIG. 5.

As shown in FIGS. 6(a) and 6(b), the second rotary body 34 is equipped with an insulated positioning recess 47N and a contact 47H (upshift switch) that facilitates transfer to a higher speed level and that functions as a moving-side electrode in conformity with a fixed-side electric connector 52 provided to the first rotary body 29. These components constitute a first switching means. Similarly, the third rotary body 36 is equipped with an insulated positioning recess 47N and a contact 47L (downshift switch) that facilitates transfer to a lower speed level and that functions as a moving-side electrode in conformity with the fixed-side electric connector 54 provided to the first rotary body 29. These components constitute a second switching means. Conductors (not shown) are connected to the contacts 47H and 47L.

Fixed-side electric connectors 52 and 54 are fastened to the same surface on the front end of the first rotary body 29 provided with the bolt 31. These fixed-side electric connectors 52 and 54 have the same construction as the structure in the first embodiment, but the size and shape of the cylinder 58 of fixed-side electrode 60 are somewhat different. Conductors 64a are 64b are connected on one side to the fixed-side electric connectors 52 are 54, respectively.

The operation of this embodiment will now be described with reference to FIGS. 5, 6(a) and 6(b). First, to brake the wheels, the rider grips the handle 19 or holder 25 with his hand, places his finger on the first operating lever 33, and pulls the lever toward himself. The turning of the first operating lever 33 causes the first rotary body 29 to turn counterclockwise around the first rotary shaft 27, and this turning action pulls a brake wire (not shown) and creates a braking action.

A shifting operation will now be described. Initially, the first operating lever 33 is in the position shown by the solid line in FIGS. 6(a) and 6(b). In this state, the steel balls 20 are positioned in the central bottom portions of the shallow grooves 16, and the electrode ball 51 of the fixed-side electric connector 52 engages the positioning recess 47N. The second operating lever 43 is in the position shown by the broken line in FIG. 6(b). In these positions, the steel balls 20 are positioned in the central bottom portions of the shallow grooves 16, and the electrode balls 51 of the fixed-side electric connectors 52 and 54 engage the positioning recesses 47N.

At this point, the fingers of the hand gripping the handle 19 or holder 25 are placed on the first operating lever 33, and this lever is rotatably displaced in the direction orthogonal to the first rotary shaft 27. The contact 47H and the fixed-side electric connector 52 come into contact when the first operating lever 33 is rotated in the direction indicated by arrow (a) in FIG. 6(b) (inward in relation to the bicycle). The contact between the fixed-side electric connector 52 and the contact 47H closes the drive circuit 65 shown in FIG. 3, and when a signal 63a from the contact 47H reaches a processor unit 64, the signal type (upshift or downshift) is identified there. When it is established that this is an upshift signal, the result is inputted to the drive circuit 65, an actuating signal is inputted to the servo motor 15, and the shifting mechanism 13 is switched to the upshift side.

Since the second rotary body 34 rotates in the same direction as the first operating lever 33, the steel balls 20 move up the sloped surfaces of the shallow grooves 16, and the first operating lever 33 automatically rotates in the direction of arrow (b) and returns to its initial position under the action of the loading force of the compression spring 22 when the hand is removed from the first operating lever 33. As a result, the contact 47H is separated from the fixed-side electric connector 52, and the electrode ball 51 is caused to engage one of the positioning recess 47N. Repeating these operations sends step-up signals in a sequential manner to the shifting mechanism 13 and makes it possible to achieve the desired speed level.

Similarly, the contact 47L and the fixed-side electric connector 54 come into contact when the second operating lever 43 is rotated in the direction indicated by arrow (a) (inward in relation to the bicycle). The contact between the fixed-side electric connector 54 and the contact 47L closes the drive circuit 65 shown in FIG. 3, and when a signal 63b from the contact 47L reaches a processor unit 64, the signal type (upshift or downshift) is identified there. When it is established that this is a downshift signal, the result is inputted to the drive circuit 65, an actuating signal is inputted to the servo motor 15, and the shifting mechanism 13 is switched to the downshift side.

Since the second rotary body 36 rotates in the same direction as the second operating lever 43, the steel balls 20 move up the sloped surfaces of the shallow grooves 16, and the second operating lever 43 automatically rotates in the direction of arrow (b) and returns to its original position under the action of the loading force of the compression spring 22 when the hand is removed from the second operating lever 43. As a result, the contact 47L is separated from the fixed-side electric connector 54, and the electrode ball 51 is caused to engage the other positioning recess 47N. Repeating these operations sends step-down signals in a sequential manner to the shifting mechanism 13 and makes it possible to achieve the desired speed level.

The flow of shift signals will now be described with reference to the flow chart shown in FIG. 4. First, when the operating lever 33 shown in FIGS. 6(a) and 6(b) is rotated in the direction of arrow (a), it is determined during step (ST1) whether the step-up switch is on or off. If it is determined that the switch is on, a counter is incremented in step ST2. It is then determined during the subsequent step ST3 whether the current position corresponds to the highest step. A one-step upshift is performed during step ST4 if the current step is not the highest step. Similarly, when the shifting lever 43 is rotated in the direction of arrow (a), it is determined during step ST5 whether the step-down switch is on or off. If it is determines that the switch is on, a counter is incremented in step ST6. It is then determined during the subsequent step ST7 whether the current position corresponds to the lowest step. A one-step downshift is performed during step ST8 if the current step is not the lowest step.

Figure 7:
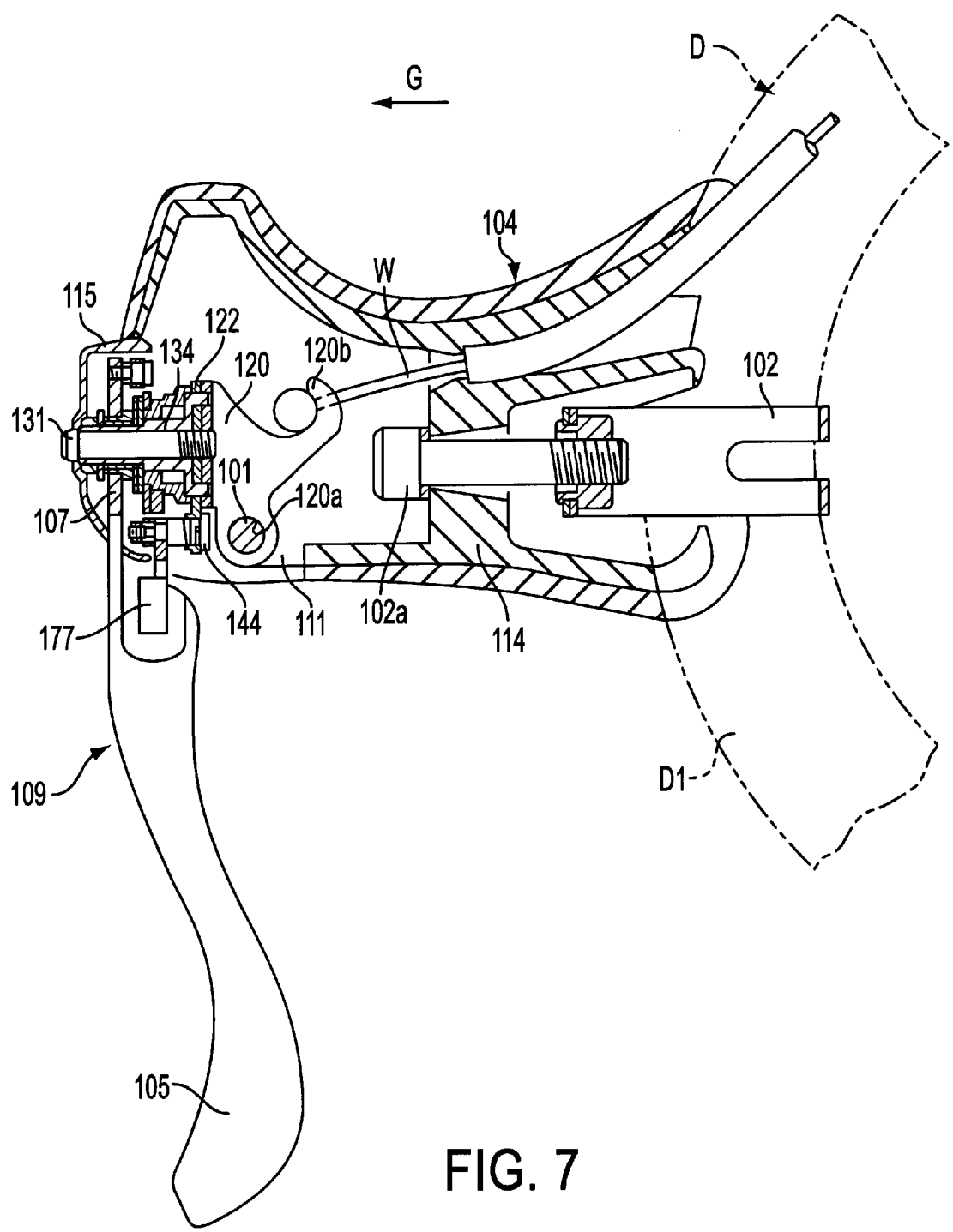
FIG. 7 is a partial cross sectional view of another alternative embodiment of an electrical operating device that may be used in the bicycle shown in FIG. 1.

FIG. 7 is a partial cross sectional view of another alternative embodiment of an electrical operating device that may be used in the bicycle shown in FIG. 1. As in the embodiments described above, multistep shifting is performed by rotating an operating lever that is used both for braking and shifting purposes. This embodiment makes maximum use of conventional mechanisms and envisages providing the brake unit body with a built-in switching means for outputting electrical signals by performing switching operations.

As shown in FIG. 7, the drop handle D of a bicycle is provided with a curved section D1 having an approximate C-shape and extending in the propulsion direction G of the bicycle. A band member 102 is attached to the curved section D1 and extends in the propulsion direction G of the bicycle. A fixed member 104, supported by the band member 102, has an outside shape that is easy to grip. A holder 114 is enclosed in the fixed member 104, wherein the holder 114 is clamped to the curved section D1 by the band member 102.

The fixing is achieved by rotating a screw 102a to stretch the band member 102 and to clamp the holder 114 to the curved section D1.

A lever support 111 is integrally formed on the surface facing the space inside the holder 114. A lever shaft 101 is supported by the lever support 111, and a base 120 is provided with a spindle bore 120a and with a wire stopper 120b having a U-shape. The base 120 is allowed to rotate (turn) in relation to the lever shaft 101 by inserting the lever shaft 101 into the spindle bore 120a. One end of a brake wire W is secured in a wire stopper 120b.

Figure 8:
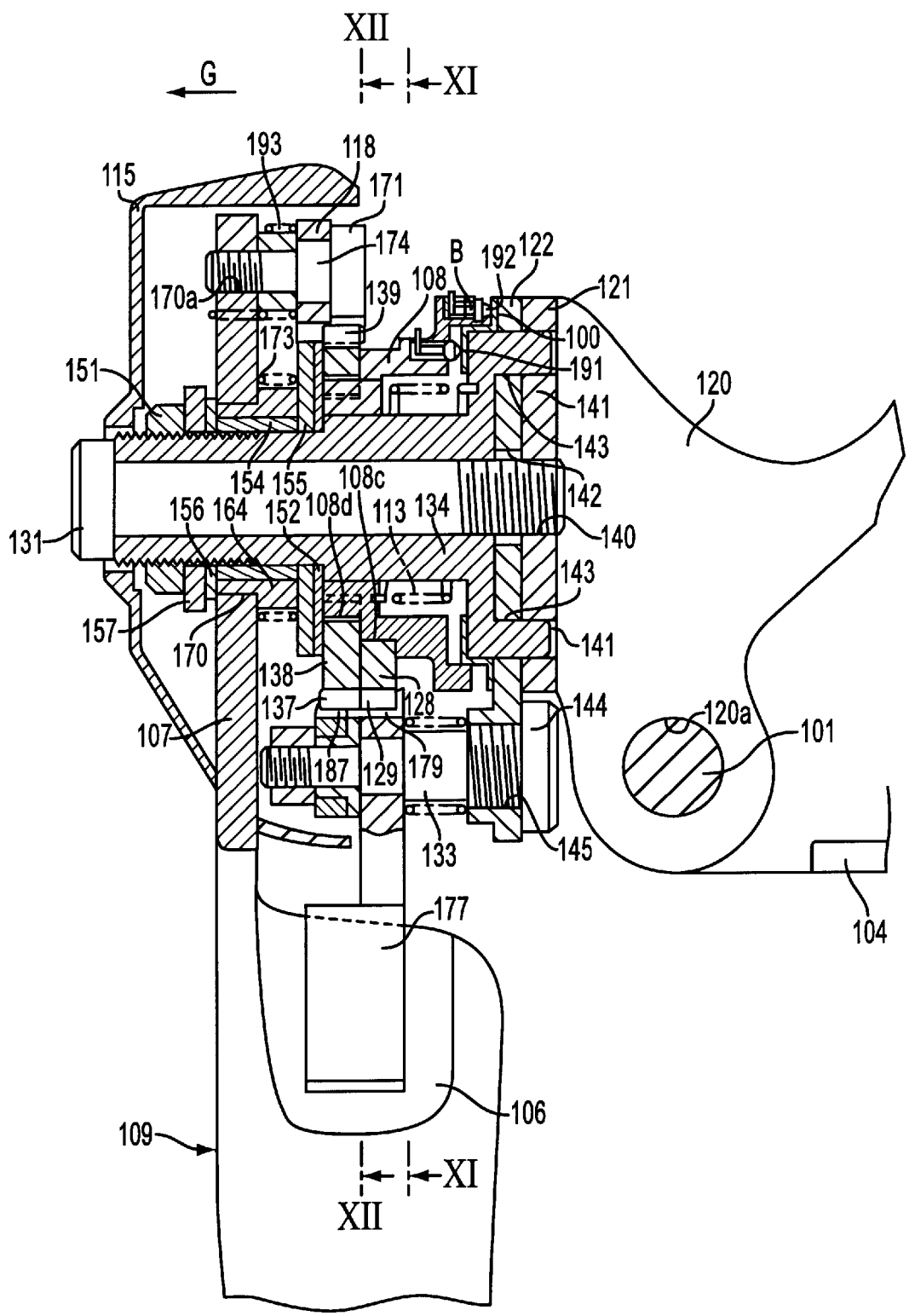
FIG. 8 is a more detailed view of the electrical operating device shown in FIG. 7.

As shown in FIG. 8, a plate 121 is bonded to the end face of the base 120 on the side facing the propulsion direction G of the bicycle, and this plate 121 is provided with a thread hole 140. The plate 121 is also provided with two spindle bores 141 equidistant from the thread hole 140. A plate 122 is in contact with the front face of the plate 121, and this plate 122 is provided with a spindle bore 142. The plate 122 is also provided with two spindle bores 143 equidistant from the spindle bore 142, and a thread hole 145 is also provided to the plate 122. In the plates 121 and 122, a fixing screw 131, which is in an orthogonal positional relationship with the lever shaft 101, is passed through the spindle bore 142 and fixedly screwed into the thread hole 140. The head of the fixing screw 131 screwed into the thread hole 140 presses a stepped support shaft 134 against the base 120. Because the end of the support shaft 134 facing the base 120 is inserted and screwed into the spindle bores 141 and 143, the support shaft 134 is secured without being allowed to rotate in relation to the plate 121 or 122.

A stepped cylindrical rotary body 108 is rotatably supported around the outside of the support shaft 134, and a return spring 113 is interposed between the support shaft 134 and the rotary body 108. As shown in FIG. 9(c), the rotary body 108 has an inner annular portion 108a and an outer annular portion 108b. An inner movable terminal A is attached to the inner annular portion 108a, and part of the inner movable terminal A is exposed to the outside from the end face of the inner annular portion 108a. An outer movable terminal B is attached to the outer annular portion 108b, and part of the outer movable terminal B is exposed to the outside from the end face of the outer annular portion 108b.

A contact base member 100 is joined to a stepped surface formed by a horizontal surface of the support shaft 134, a vertical end face of the plate 122, and a vertical end face of the support shaft 134. Six fixed-side terminals C (C1 through C6) are joined to the contact base member 100. The fixed-side terminals C comprise inner fixed terminals C1 through C3 and outer fixed terminals C4 through C6. The inner fixed terminals C1 through C3 are fitted into the portion of the contact base member 100 fitted to the vertical end face of the support shaft 134, and the outer fixed terminals C4 through C6 are fitted into the portion of the contact base member 100 fitted to the vertical end face of plate 122. The inner fixed terminals C1 through C3 and the outer fixed terminals C4 through C6 are fixed with an insulating material and integrally formed with contact base member 100. The three inner fixed terminals C1 through C3 occupy three different angular positions on concentric circles in a plane orthogonal to the central axis of the rotary body 8, and the three outer fixed terminals C4 through C6 occupy three different angular positions on concentric circles in a plane orthogonal to the central axis of the rotary body 8. The inner movable terminal A can be electrically connected to the inner fixed terminals C1 through C3 via a free-rotating contact ball 191, and the outer movable terminal B can be electrically connected to the outer fixed terminals C4 through C6 via a free-rotating contact ball 192.

Figure 10:
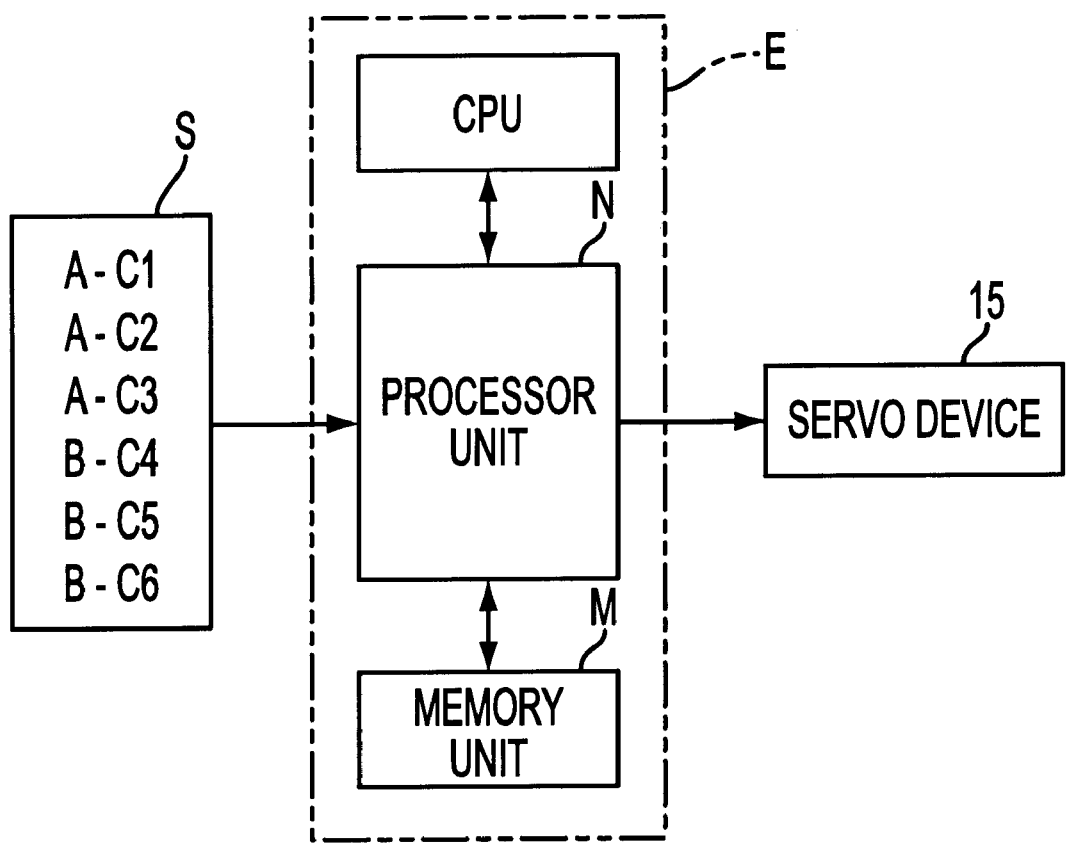
FIG. 10 is a block diagram of a particular embodiment of an electronically controlled shifting device according to the present invention that may be used with the electrical operating device shown in FIG. 7.

FIG. 10 is a functional block diagram of a control circuit for controlling the servo device 15. The movable terminals A and B, as well as the fixed terminals C1 through C6 connected thereto, form a switch S having six switching means. The switch S is connected to a control unit E. The control unit E is a processor that comprises a CPU, a processor unit N, and a memory unit M and that allows the inner movable terminal A and the outer movable terminal B to rotate simultaneously.

Figure 9A:
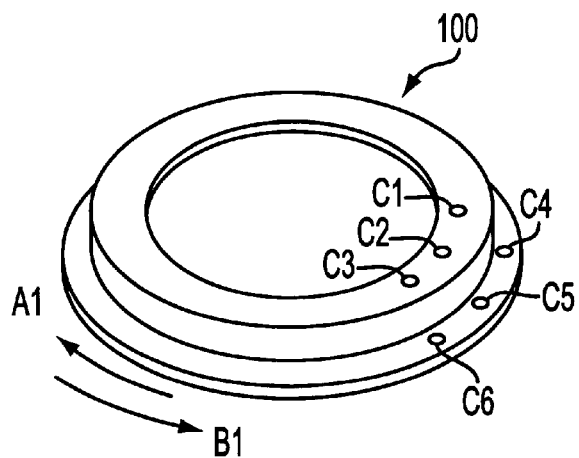
FIG. 9(a) is an oblique view of a fixed-side contact member used in the electrical operating device shown in FIG. 7.
Figure 9B:
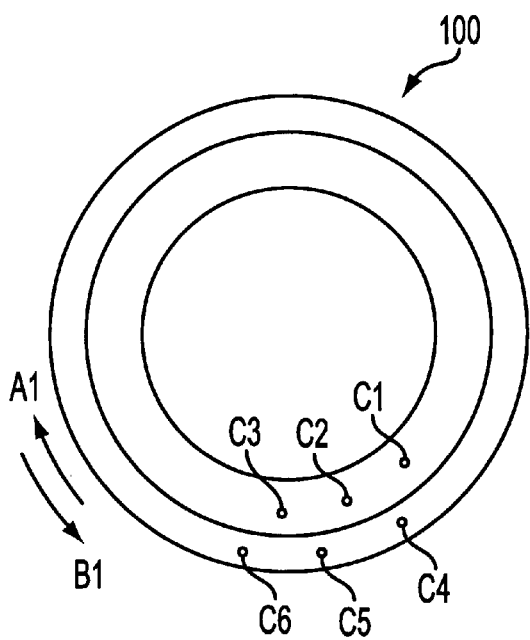
FIG. 9(b) is a front view of the fixed-side contact member shown in FIG. 9(a)
Figure 9C:
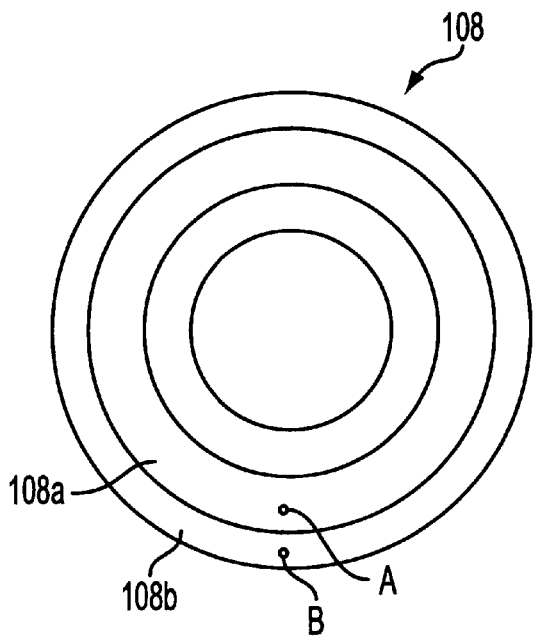
FIG. 9(c) is a front view of a movable contact member used in the electrical operating device shown in FIG. 7.

As shown in FIG. 9, the terminal pairs are connected in the following sequence: (A-C1), (B-C4), (A-C2), (B-C5), (A-C3), and (B-C6). For these connections, each position is identified by the memory unit M, and the corresponding positions are stored. Consequently, when the movable terminals rotate in the direction indicated by A1, the circuits are connected in the sequence indicated, and the fact that this combination is connected during rotation in this direction can be verified by the processor unit N. When a connection is made in this direction (A1), the control unit E issues a command for the servo device 15 to cause an upshift. A connection in the reverse direction (B1) can be made in the same manner, in which case the control unit E will order the servo device 15 to cause a downshift.

As shown in FIG. 8, stepped fitting parts 108c and 108d are provided close to the inner periphery of the rotary body 108. The fitting part 108c is provided with a semicircular positioning plate 128 incapable of rotating in relation to the rotary body 108, and the fitting part 108d is provided with a discoid feed plate 138 incapable of rotating in relation to the rotary body 108. The positioning plate 128 and the feed plate 138 are positioned close to each other. The front end face of the rotary body 108 roughly coincides with the stepped surface of the support shaft 134, a plate 152 is pressed against this end face, and this plate is inserted into and held by the support shaft 134. A spring bracket plate 155 is brought into contact with the front end face of the plate 152, and this plate is inserted into and nonrotatably held by the support shaft 134. A sleeve 154 is brought into contact with the front end face of the spring bracket plate 155, and this sleeve is nonrotatably mounted on the support shaft 134.

A stepped bearing 164 is rotatably pivoted on the sleeve 154, and this stepped bearing 164 is fixedly mounted in a spindle bore 170, which is formed in the end portion 107 of an operating lever 109. A limiter 116 (FIG. 11) is formed along the outer periphery of the center of rotation of the operating lever end portion 107, and this limiter 116 is pressed against a stopper 117 provided at one end along the outer periphery of stepped bearing 164. A torsion coil spring 173 is interposed and mounted between the operating lever 107 and the spring bracket plate 155, and the operating lever 107 is loaded in such a way that it can rotate (turn) in one direction. The spring bracket plate 155 is provided with a release unit 155b (FIG. 11) and a spring sheet 155a for catching one end of the torsion coil spring 173.

A spacer 156, which is in contact with the front end face of the operating lever end portion 107, is inserted into and held by the support shaft 134, and a plate 157 in contact with the spacer 156 is fixedly inserted into the support shaft 134. The spacer 156 and plate 157, while pressed against the front end face of the sleeve 154, are held by a nut 151 screwed onto the end portion of the support shaft 134. As a result, the operating lever 109 is restricted in its axial movement and rotatably (turnably) supported while rotatably loaded in one direction around the sleeve 154. The head of the fixing screw 131 and the threaded portion of the support shaft 134 are provided with an arm-type cover 115 to enclose the internal mechanism.

A stepped support shaft 144 is screwed into the thread hole 145 formed in the plate 122, and a control lever 177 is rotatably (turnably) pivoted on the small-diameter stepped portion of the support shaft 144. A torsion coil spring 133 is located around the outside of the support shaft 144, and the control lever 177 is rotatably loaded in one direction (clockwise in FIG. 11) by this torsion coil spring 133. A recess 106 is formed in the operating lever 109 (see FIG. 8), making it possible for the components to move closer to each other due to the rotation of the control lever 177.

Figure 11:
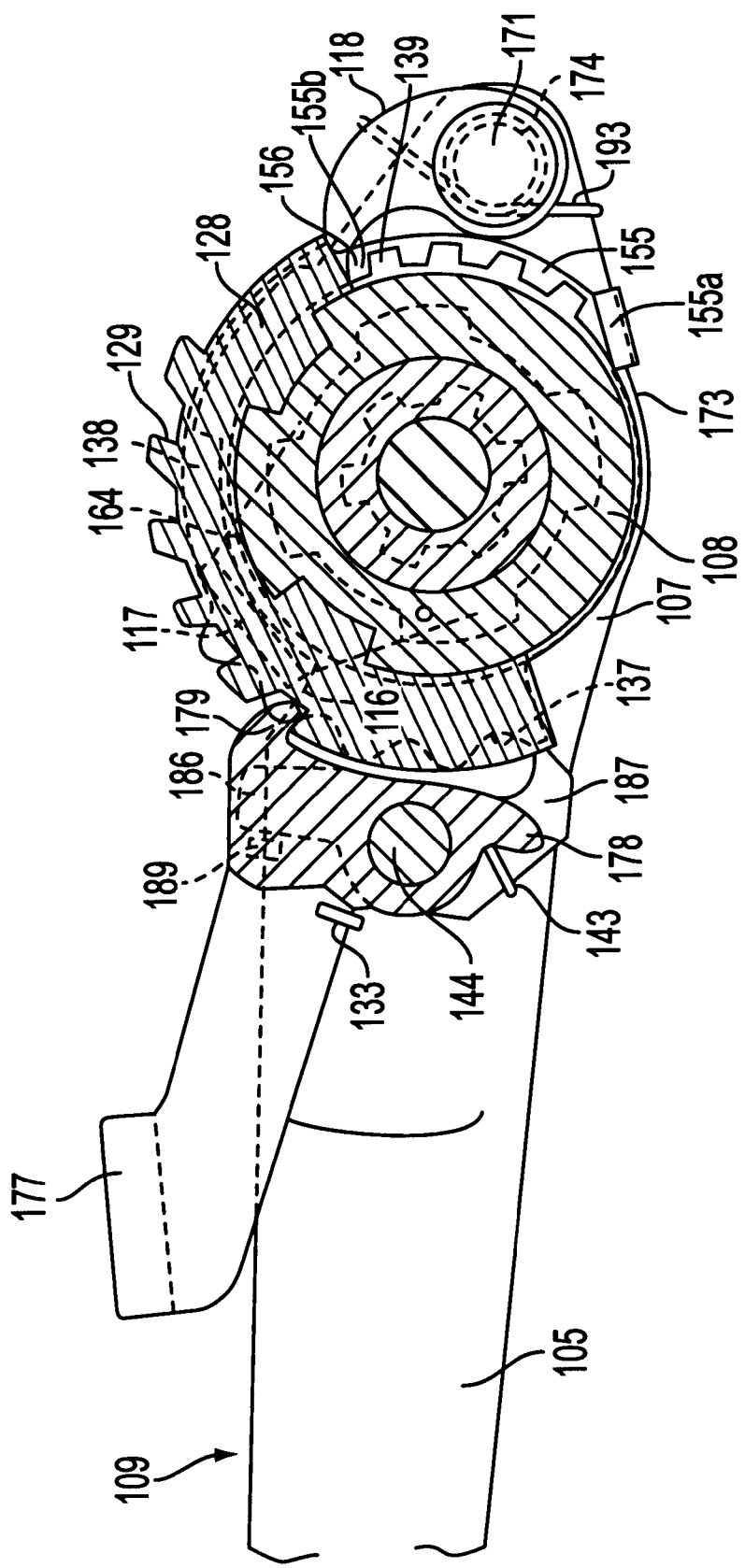
FIG. 11 is a view taken along line XI—XI in FIG. 8.

A thread hole 170a is formed in the end portion extending outward from the center of rotation of the operating lever 109, and the screw 171 of a stepped support shaft 174 is threadably coupled with the thread hole 170a. Thus, the support shaft 174 is fixed to one end of the operating lever 109. In the large-diameter stepped portion of the support shaft 174, a pawl member 118 such as that shown in FIG. 11 is rotatably pivoted at a distance from the back end face of the operating lever 109. A torsion coil spring 193 is positioned around the support shaft 174 between the operating lever 109 and the pawl member 118, and the pawl member 118 is rotatably loaded in one direction by this torsion coil spring 193.

FIG. 11 shows the positioning plate 128 fixedly mounted on the stepped portion of the rotary body 108 in more detail. This positioning plate 128 is provided with six engagement grooves 129 inclined in one direction along the outer periphery of a semicircular shape. An engagement pawl 179 inclined in one direction and used for engagement with the aforementioned engagement grooves 129 is also formed in the base end portion of the control lever 177. A limiter 178, in which the side facing the positioning plate 128 is curved, is provided to the base end portion of the control lever 177 on the side facing the engagement pawl 179 across the support shaft 144. A stopper 189 is provided to the control lever 177 on the side facing the operating lever 107.

Figure 12:
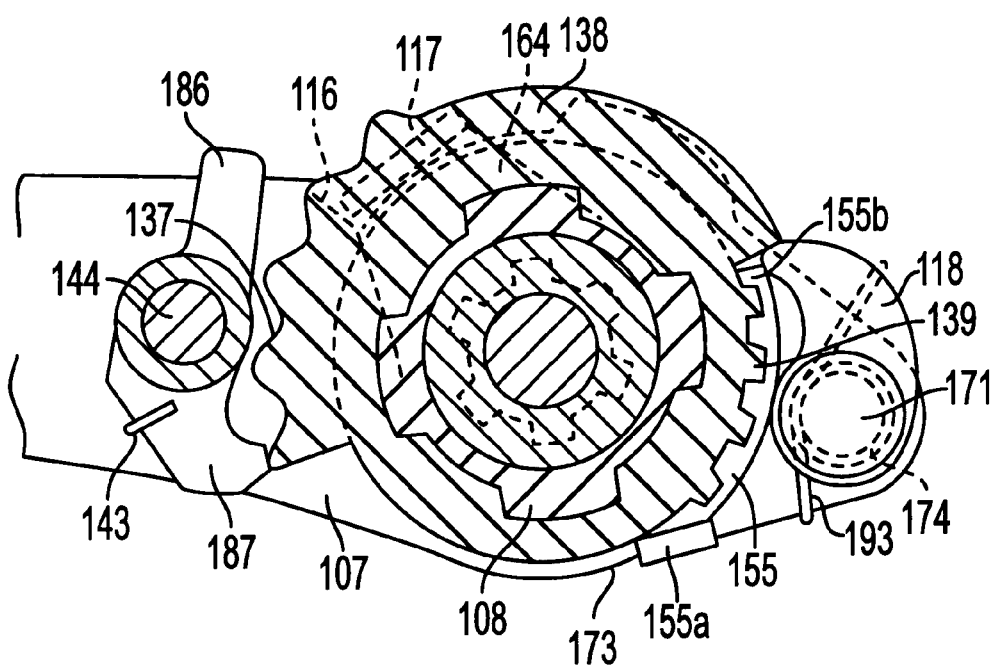
FIG. 12 is a view taken along line XII—XII in FIG. 8.

As shown in FIGS. 11 and 12, five inclined engagement teeth 139 are formed along a portion of the outer periphery of the discoid feed plate 138 on the side facing the pawl member 118. Five wave-shaped control recesses 137 are formed on the side that is opposite in relation to the center of rotation of the feed plate 138. The wave-shaped control recesses 137 formed in the feed plate 138 have the same pitch as the six engagement grooves 129 formed along the outer periphery of the aforementioned positioning plate 128, and these recesses are shifted by a half pitch in the circumferential direction in relation to the engagement grooves 129.

The support shaft 144 for supporting the control lever 177 also rotatably supports a limiting pawl 187 whose end portion extends in the direction of the wave-shaped control recesses 137 in the end portion of the control lever 177 on the side facing the limiter 178.

The limiting pawl 187 is rotatably pivoted on the support shaft 144 adjacent to the lateral surface of the control lever 177 and is provided with an engagement tongue 186 on the side facing the base end portion. The limiting pawl 187 is rotatably loaded in the counterclockwise direction around the support shaft 144 by a torsion coil spring interposed between the limiting pawl 187 and the control lever 177.

The operation of this embodiment will now be described. When braking, the rider grips the fixed member 104 or the curved section D1 of the drop handle D with his hand. The fingers of the hand gripping the curved section D1 or the fixed member 104 are placed on the control element 105 of the operating lever 109, and the control element 105 of the operating lever 109 is pulled toward the curved section D1. Because the base 120 and the control element 105 of the operating lever 109 are integrated by means of the support shaft 134, the lever shaft 101 turns around its center. The turning action pulls the brake wire W and performs braking.

When performing a shifting operation, the rider grips the fixed member 104 or the curved section D1 of the drop handle D with his hand. The fingers of the hand gripping the curved section D1 or the fixed member 104 are placed on the control element 105 of the operating lever 109 or on the control element of the control lever 177. The control element 105 of the operating lever 109 or the control element of the control lever 177 is rotated counterclockwise (as viewed from the drop handle D in the propulsion direction G of the bicycle) around the support shaft 134, which is orthogonal to the lever shaft 101. Shifting is performed by these rotary actions.

The mechanism for performing shifting will now be described in detail with reference to FIGS. 11 through 15.

Figure 13:
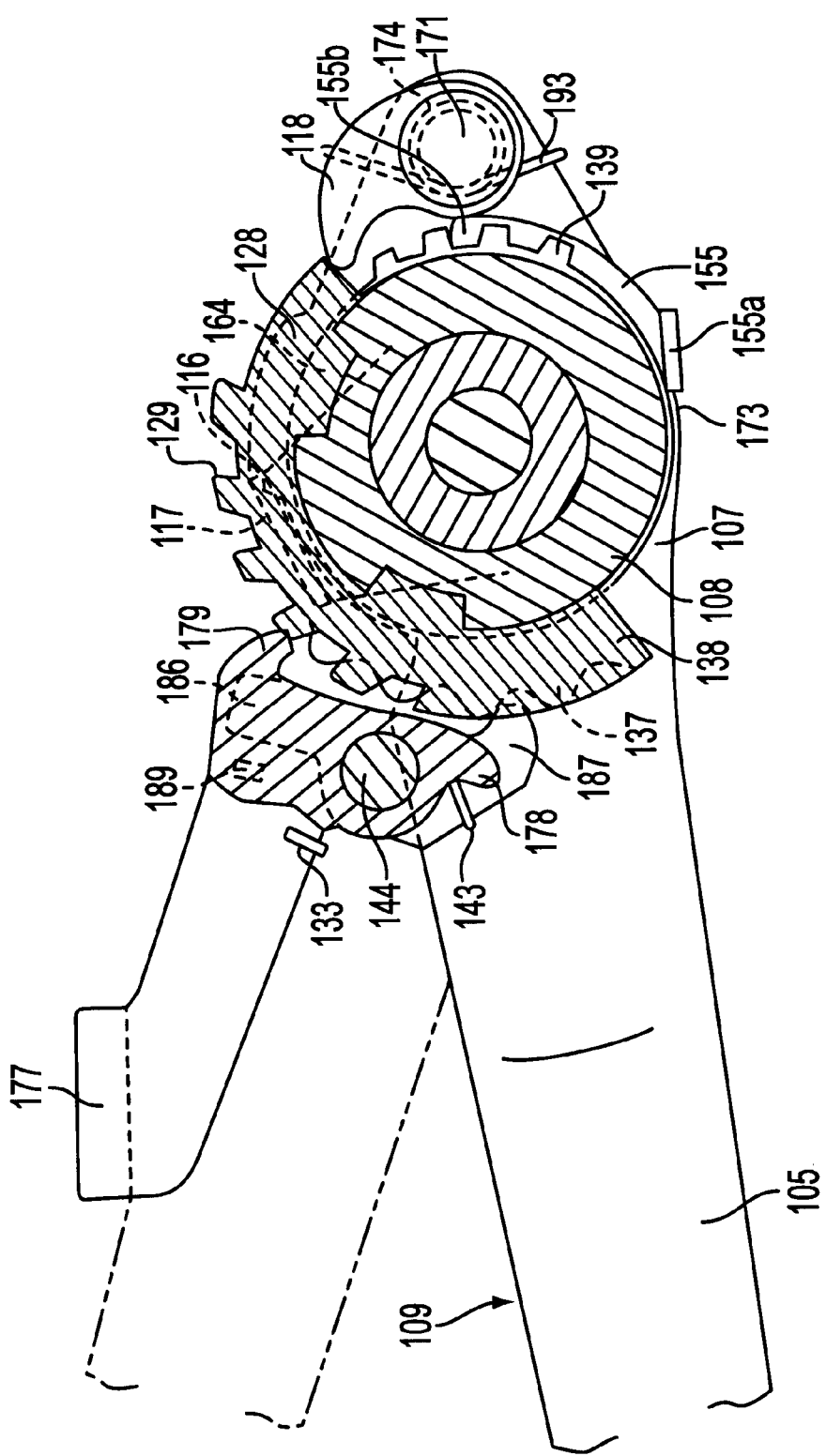
FIGS. 13 and 14 are diagrams illustrating how the components shown in FIG. 11 are operated in a downshifting direction.
Figure 14:
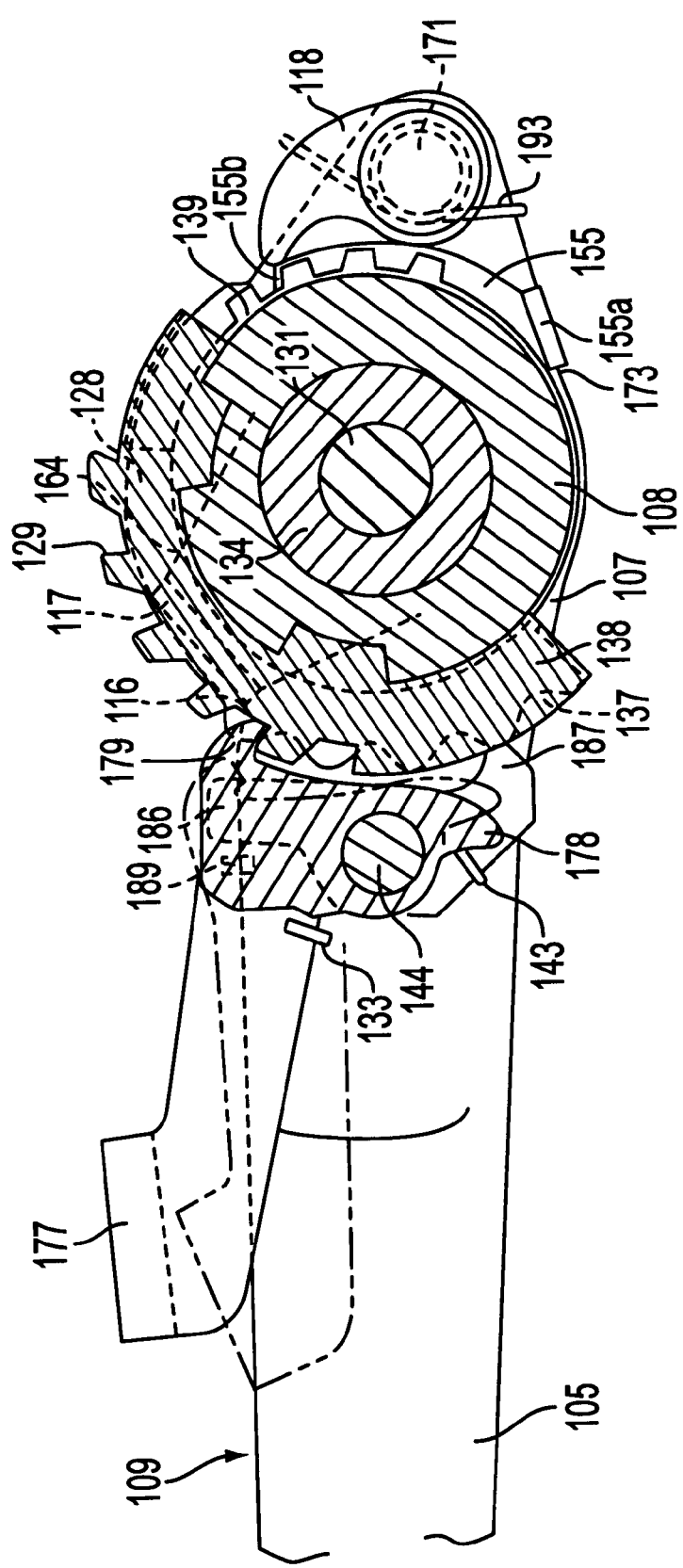
Figure 15:
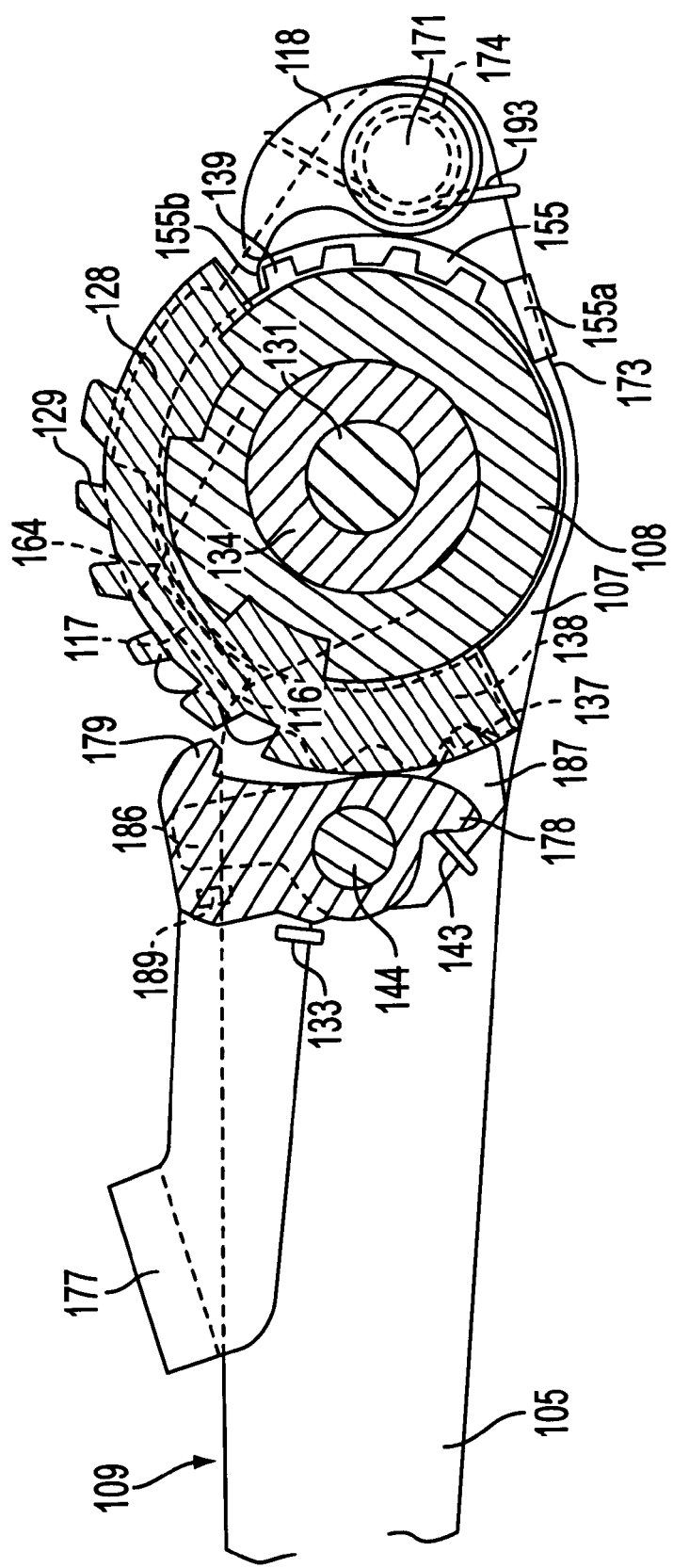
FIG. 15 is a diagram illustrating how the components shown in FIG. 11 are operated in an upshifting direction.

FIG. 11 depicts the state in which the maximum speed level (sixth step) is engaged, and FIG. 13 depicts a transitional state in which the gears are shifted from the highest speed level (sixth step) to a speed one step below (fifth step). FIG. 14 depicts the state in which the speed (fifth step) one step below the highest speed level (sixth step) is engaged. FIG. 15 depicts a transitional state in which the gears are shifted to the highest speed level (sixth step) from the speed (fifth step) one step below the highest speed level. The initial operating position will be described here. Specifically, the term "initial operating position" refers to a state in which a prescribed step is engaged, irrespective of whether it is a higher or lower speed level.

As long as the rider's hand is not placed on the control element 105 of the operating lever 109, the limiter 116 provided to the lever end portion 107 of the operating lever 109 remains pressed against the stopper 117 provided to an end portion along the outer periphery of the stepped bearing 164, which is installed nonrotatably with respect to the support shaft 134, as shown in FIGS. 11 and 14. The control element 105 of the operating lever 109 remains vertical and stationary in relation to the lever shaft 101. In addition, the tip of the pawl member 118 comes into contact with the release unit 155b of the spring bracket plate 155 because this member is loaded by the torsion coil spring 193. At this time, the tip of the pawl member 118 engages none of the five engagement teeth 139 formed on the feed plate 138, which is incapable of rotating in relation to the rotary body 108. In other words, the tip of the pawl member 118 in the initial operating position does not transmit the force generated by the rotation of the control element 105 of the operating lever 109 to the rotary body 108.

As long as the rider's hand is not placed on the control lever 177, one of the six engagement grooves 129 of the positioning plate 128, which is installed nonrotatably with respect to the rotary body 108, engages the engagement pawl 179 provided to the base end portion of the control lever 177. As a result of this engagement, the rotary body 108 resists the action of the torsion coil spring 113, and the rotation of the rotary body 108 is controlled.

FIG. 11 depicts the initial operating position of the highest speed level (sixth step). Shifting is performed from this state. The rider grips the fixed member 104 or the curved section D1 of the drop handle D shown in FIG. 7 and places his finger on the control element 105 of the operating lever 109. The control element 105 of the operating lever 109 is rotated counterclockwise (as viewed from the drop handle D in the propulsion direction G of the bicycle) around the support shaft 134, which is orthogonal to the lever shaft 101. As shown in FIG. 13, the rotation of the control element 105 of the operating lever 109 separates the tip of the pawl member 118 and the release unit 155b of the spring bracket plate 155. The pawl member 118 is loaded by the spring 193, so when the tip of the pawl member 118 and the release unit 155b of the spring bracket plate 155 are separated from each other, the tip of the pawl member 118 comes into contact with one of the five engagement teeth 139 of the feed plate 138 installed nonrotatably with respect to the rotary body 108.

When the operating force of the control element 105 is transmitted to the rotary body 108 by the tip of the pawl member 118, the operating force of the control element 105 transmitted to the rotary body 108 rotates the rotary body 108 counterclockwise against the action of the torsion coil spring 113. The six engagement grooves 129 formed in the positioning plate 128 and the engagement pawl 179 provided to the base end portion of the control lever 177 are both effective solely for the clockwise rotation of the rotary body 108, and constitute a control means. Consequently, the counterclockwise rotation of the rotary body 108 disengages the engagement pawl 179 provided to the base end portion of the control lever 177 and the engagement groove 129 of the highest speed level (sixth step). In the process, the limiting pawl 187 loaded by the torsion coil spring 143, which is provided to the support shaft 144 for supporting the control lever 177, is pressed against one of the wave-shaped control recesses 137 formed in the feed plate 138.

The control recesses 137 formed in the feed plate 138 are shifted by a half pitch in the circumferential direction in relation to the engagement grooves 129 formed in the positioning plate 128. Contact between the limiting pawl 187 and one of the control recesses 137 limits the operating force of the control element 105 and the amount of double action performed by the torsion coil spring 113. The stopper 189 integrally provided to the control lever 177 on the side facing the operating lever end portion 107 comes into contact with the tongue 186 provided to the limiting pawl 187 on the side facing the base end portion, and the tongue 186 is pressed against the rotary body 108 when the engagement grooves 129 formed in the positioning plate 128 and the engagement pawl 179 provided to the base end portion of the control lever 177 are first disengaged and then reengaged.

The limiting pawl 187 loaded by the torsion coil spring 143 and the control recess 137 formed in the feed plate 138 are again separated from each other. As shown in FIG. 14, the engagement pawl 179 provided to the base end portion of the control lever 177 is disengaged from the engagement groove 129 that indicates the speed (fifth step) one step below the highest speed level (sixth step). As a result, the speed (fifth step) one step below the highest speed level is maintained, and the mechanism returns to its initial operating position. The procedures described above should be repeated to achieve a speed (fourth step) that is lower by one more step.

Control and operation procedures for switching from a lower speed level to a higher speed level will now be described with reference to FIGS. 11 through 15. As shown in FIG. 14, the engagement pawl 179 provided to the base end portion of the control lever 177 engages the engagement groove 129 that indicates the speed (fifth step) one step below the highest speed level. The rider then grips the fixed member 104 or the curved section D1 of the drop handle D shown in FIG. 7 and places the fingers of the hand gripping the curved section D1 or the fixed member 104 on the control element of the control lever 177. The control element of the control lever 177 is rotated counterclockwise (as viewed from the drop handle D in the propulsion direction G of the bicycle) around the support shaft 134, which is orthogonal to the lever shaft 101. As shown in FIG. 15, the rotation of the control element of the control lever 177 separates the engagement pawl 179 provided to the base end portion of the control lever 177 and the engagement groove 129 that indicates the speed (fifth step) one step below the highest speed level (sixth step).

In the process, the force of the torsion coil spring 113 assists the rotary body 108 in its rotational motion toward a higher speed level (sixth step), but the rotation of the rotary body 108 must be controlled in order to rotate and shift the rotary body 108 in single steps. Therefore, the limiter 178 on the opposite end of the engagement pawl 179 provided to the base end portion of the control lever 177 functions as a control means for ensuring contact with the outer peripheral surface of the positioning plate 128 when the control element of the control lever 177 has performed a reciprocating operation in the counterclockwise direction.

Another control means is a means for ensuring contact between the control recesses 137 formed in the feed plate 138 and the limiting pawl 187 loaded by the torsion coil spring 143, which is provided to the support shaft 144 for supporting the control lever 177. These control means control the rotation of the rotary body 108. The stopper 189 comes into contact with the tongue 186, and the tongue 186 is pressed against the rotary body 108 when the engagement grooves 129 formed in the positioning plate 128 and the engagement pawl 179 provided to the base end portion of the control lever 177 are first disengaged and then reengaged.

In this case, the limiting pawl 187 and the control recess 137 are again separated from each other. As shown in FIG. 11, the engagement pawl 179 provided to the base end portion of the control lever 177 engages the engagement groove 129 that indicates the speed that is one step higher, that is, the highest speed level (sixth step). This groove is one of the six engagement grooves 129 formed in the positioning plate 128. As a result, the highest speed (sixth step) is maintained, and the mechanism returns to its initial operating position. The procedures described above should be repeated to change the speed by one more step from a lower step to a higher step.

Figure 16:
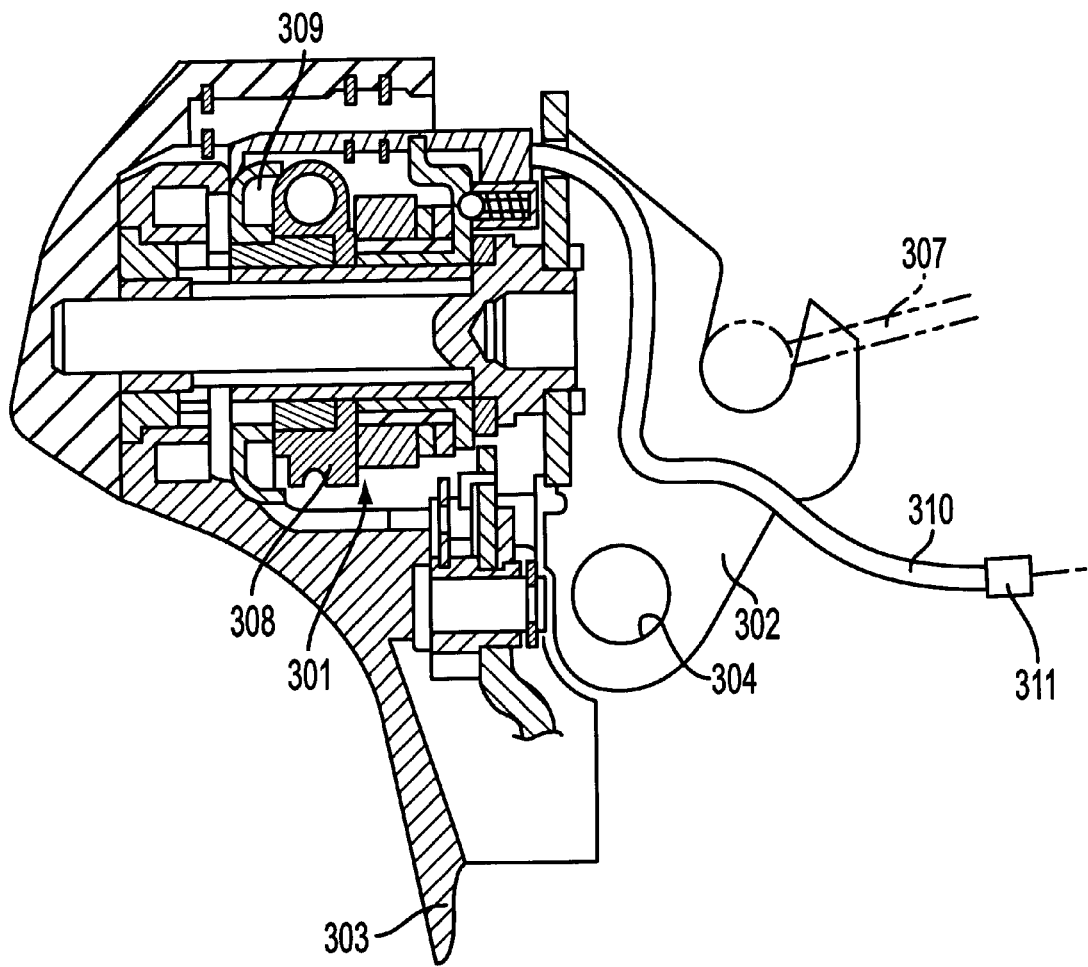
FIG. 16 is a partial cross sectional view of another alternative embodiment of an electrical operating device that may be used in the bicycle shown in FIG. 1.

FIG. 16 is a partial cross sectional view of another alternative embodiment of an electrical shifting device 301 that may be used in the bicycle shown in FIG. 1. The shifting device 301 is mounted on a swing body unit 302. Braking and shifting can both be performed using the same operating lever 303. The swing body unit 302 is mounted on a bar bracket while allowed to turn around a swing shaft (not shown) passing through a spindle bore 304. In addition, one end of a brake cable 307 is connected to the swing body unit 302. Furthermore, one end of a derailleur wire (not shown) for driving the front derailleur (not shown) or rear derailleur (not shown) of a change gear device is linked to the winding drum 308 of the shifting device 301.

During braking, the rider grips the operating lever 303, turns the swing body unit 302 around the swing shaft together with the shifting device 301, pulls the brake cable 307, and performs braking. During shifting, the rider rotates the operating lever 303 around the axis of rotation orthogonal to the swing shaft, rotatably drives the winding drum 308, pulls the derailleur wire, and performs shifting. Therefore, the turning of the swing body unit 302 by the operating lever 303 initiates braking, and the rotation of the winding drum 308 by the operating lever 303 initiates shifting. The shifting device 301 has a conventional structure (see, for example, Japanese Laid-Open Patent Application 2-225191). The detailed structure is not an important feature of the present invention, and is therefore omitted from the description.

The shifting device 301 is provided with a position sensor 309 for detecting the rotational position of the winding drum 308. The position sensor 309 electrically senses the angle of the winding drum 308 by contact. The shift position of a derailleur can therefore be determined by sensing the angle of the winding drum 308. One end of a flat cable 310 having a plurality of signal lines is connected to the position sensor 309. The other end of the flat cable 310 is composed of a male connector 311 for connection to the female connector of a lever bracket and for connection to a bicycle display device or the like. The position sensor 309 can output signals that indicate the shift positions of the change gear device, and to display these shift positions on the bicycle display device or the like.

Figure 17:
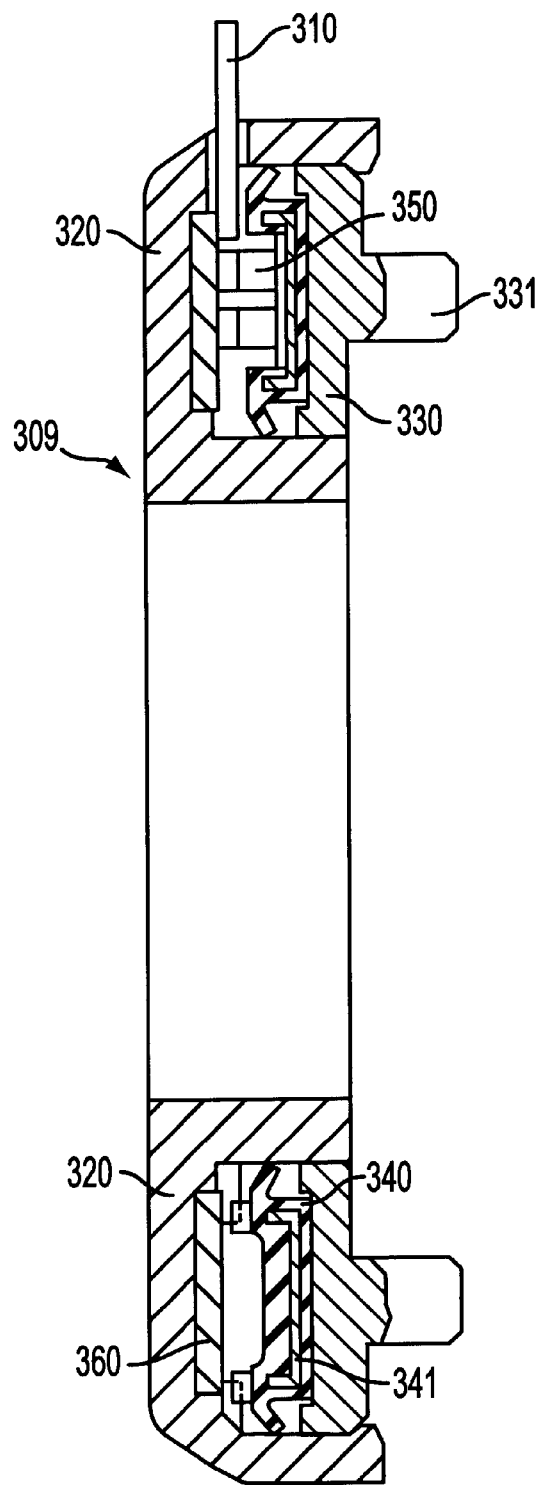
FIG. 17 is an enlarged cross sectional view of a particular embodiment of a position sensor that may be used in the electrical operating device shown in FIG. 16.

FIG. 17 is an enlarged cross section of the position sensor 309. The position sensor 309 comprises a fixed unit 320 immovable in relation to the swing body unit 302 and a rotating unit 330 capable of rotating with respect to the fixed unit 320 together with the winding drum 308. The engagement projection 331 of the rotating unit 330 engages the winding drum 308, and when the winding drum 308 is rotated by shifting, the rotating unit 330 rotates while interlocked therewith.

A seal member 340 and a brush 350 (switching member) are fixed to the rotating unit 330. The seal member 340, which consists of a rubber, elastomer, or other material integrally molded with a reinforcing element 341, is designed to prevent moisture or foreign matter from entering the electric contacts inside the position sensor 309 through the gap between the rotating unit 330 and the fixed unit 320. A plurality of electric contacts are formed on a contact base plate 360 fixed to the fixed unit 320, and the interconnection state of these electric contacts is switched by the brush 350. In addition, the flat cable 310 having a plurality of signal lines is connected to the contact base plate 360, and the interconnection state of the electric contacts is outputted via the flat cable 310.

Figure 18:
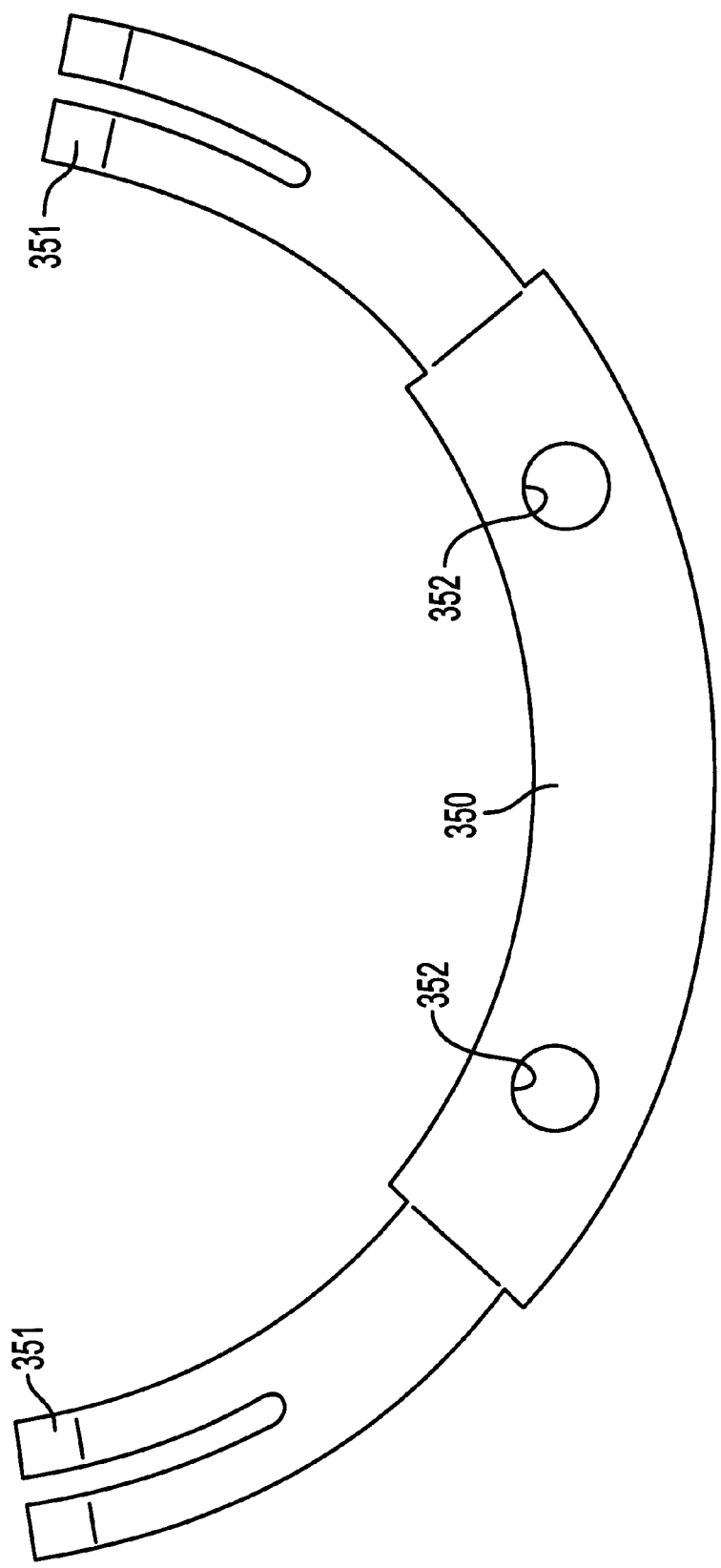
FIG. 18 is an enlarged view of a particular embodiment of an electrical brush that may be used in the electrical operating device shown in FIG. 16.

FIG. 18 is an enlarged view depicting the structure of the brush 350. The brush 350, which is composed of a phosphor bronze conductor or other good conductor with adequate spring characteristics, is fixed to the rotating unit 330 together with the seal member 340 with the aid of attachment holes 352. The contacts 351 on the two ends of the brush 350 come into contact with the electric contacts formed on contact base plates 360 and 370 (described below), and these electric contacts are connected together or disconnected from each other.

Figure 19:
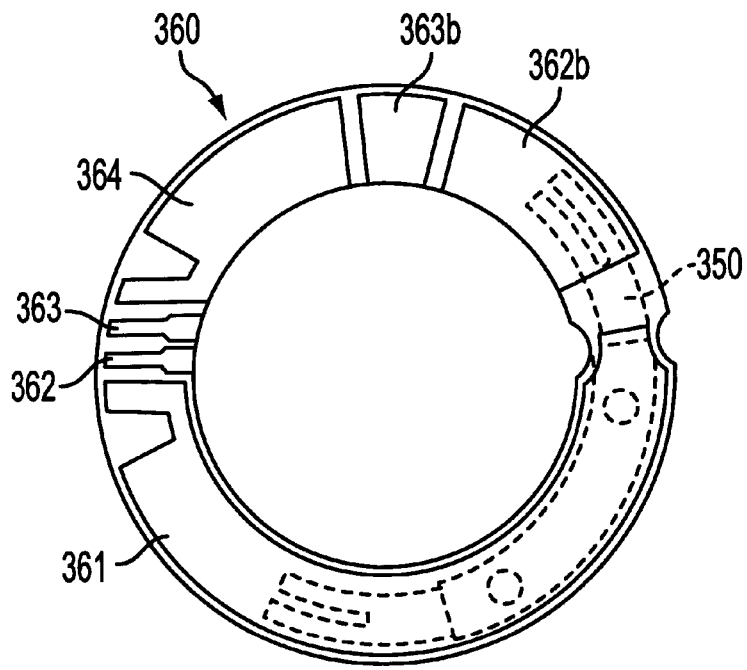
FIG. 19 is a diagram illustrating a particular embodiment of a front pattern of a contact base plate that may be used in an electrical operating device shown in FIG. 16 that may be used with a front shifting device.

FIG. 19 is a diagram depicting the front pattern of the contact base plate 360 of the position sensor 309 for the front section. The front side, which is the side in contact with the brush 350, is provided with a plurality of electric contacts 361, 362, 362*b*, 363, 363*b*, and 364. In addition, contact terminals for the flat cable 310 are provided on the left side of FIG. 19. The flat cable 310 requires at least four signal lines. The brush 350 indicated by a two-dot chain line is provided to connect the electric contacts to each other, and the interconnection state of the electric contacts is switched.

Figure 20:
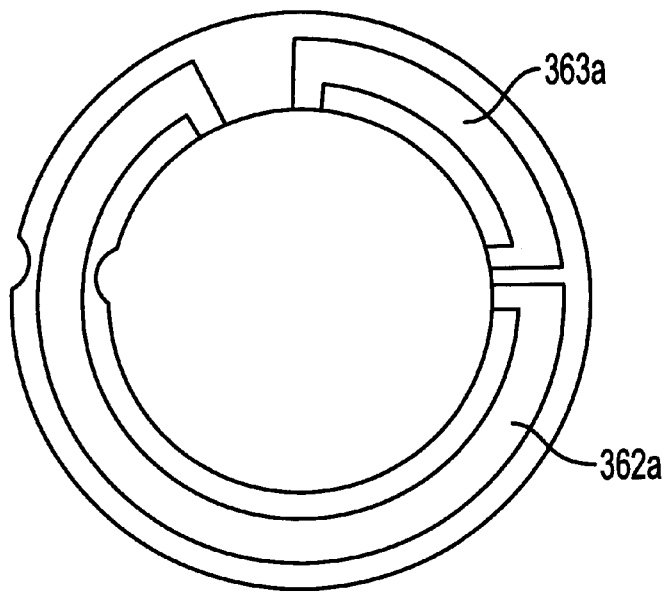
FIG. 20 is a diagram illustrating a particular embodiment of a rear pattern of the contact base plate shown in FIG. 19.

FIG. 20 is a diagram depicting the back pattern of the contact base plate 360 of the position sensor for the front section. The back side is provided with a connecting pattern 362*a* for electrically connecting the electric contacts 362*b* and 362 on the front side, and with a connecting pattern 363*a* for electrically connecting the electric contacts 363*b* and 363 on the front side. The electric contacts on the front side and the connecting patterns on the back side are electrically connected via through holes.

Figure 21:
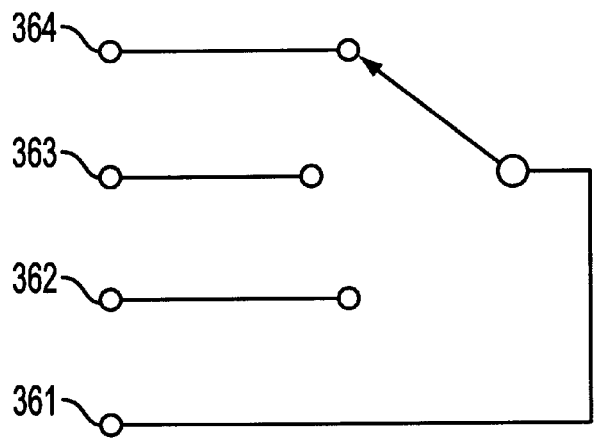
FIG. 21 is an equivalent electrical circuit for an electrical operating device that employs the contact base plate shown in FIGS. 19 and 20.

FIG. 21 is a diagram depicting the equivalent electric circuit of the position sensor 309 for the front section. The interconnection state of the electric contact 361 and the electric contacts 362 through 364 is switched depending on the rotational position of the brush 350. The shift position of the front change gear device can be identified depending on which of the electric contacts 362 through 364 is connected to the electric contact 361. The shift position can be detected by such a circuit because the front change gear device has relatively few shift stages. In this case, there are three shift stages.

Figure 22:
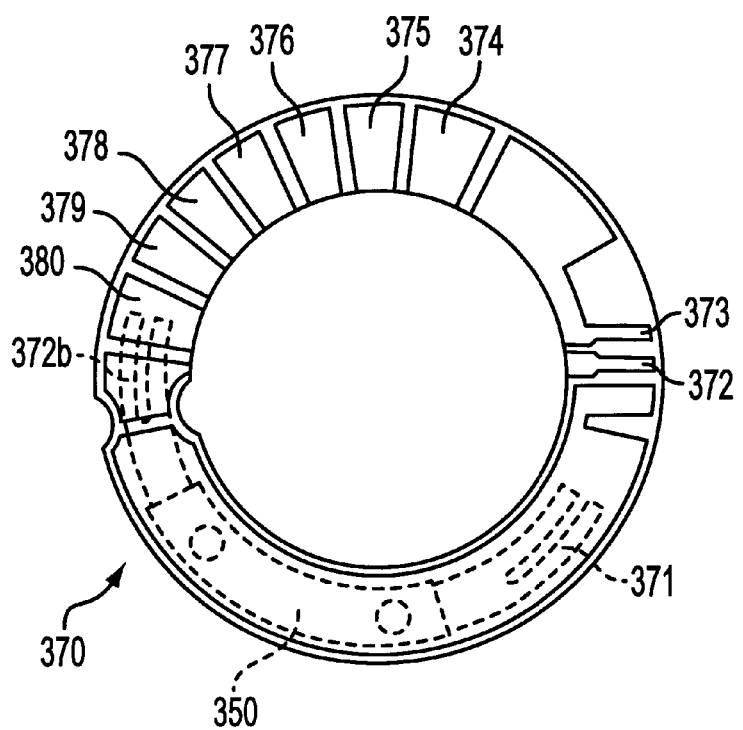
FIG. 22 is a diagram illustrating a particular embodiment of a front pattern of a contact base plate that may be used in an electrical operating device shown in FIG. 16 that may be used with a rear shifting device.

FIG. 22 is a diagram depicting the front pattern of the contact base plate 370 of the position sensor 309 for the rear section. The front side, which is the side in contact with the brush 350, is provided with a plurality of electric contacts 371, 372, 372b, and 373 through 380. In addition, contact terminals for the flat cable 310 are provided on the right side of FIG. 22. The flat cable 310 requires at least three signal lines. The brush 350, indicated by a two-dot chain line, is provided to connect the electric contacts to each other, and the interconnection state of the electric contacts is switched.

Figure 23:
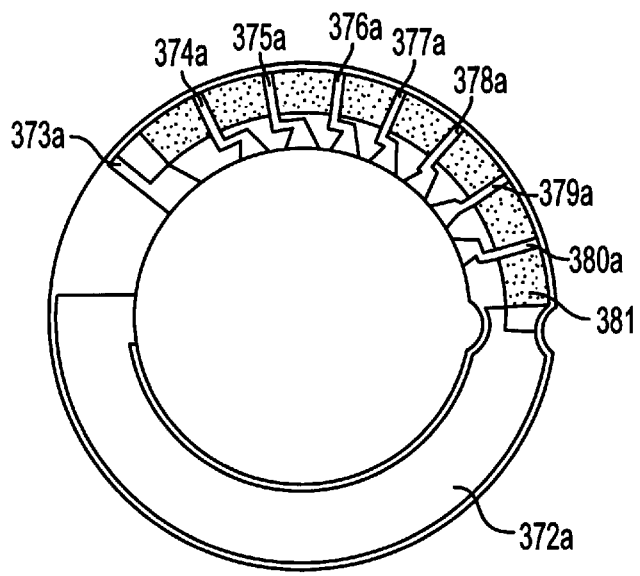
FIG. 23 is a diagram illustrating a particular embodiment of a rear pattern of the contact base plate shown in FIG. 22.

FIG. 23 is a diagram depicting the back pattern of the contact base plate 370 of the position sensor for the rear section. The back side is provided with a connecting pattern 372a for electrically connecting the electric contacts 372b and 372 on the front side, a resistor film 381, and resistor terminals 373a through 380a. The two ends of the resistor film 381 are connected to the resistor terminal 373a and the connecting pattern 372a. In addition, resistor terminals 374a through 380a are connected in equidistant locations in the midportion of the resistor film 381. The resistor terminals 373a through 380a on the back side are electrically connected to the respective electric contacts 373 through 380 on the front side. The electric contacts on the front side and the resistor terminals and connecting patterns on the back side are electrically connected via through holes.

Figure 24:
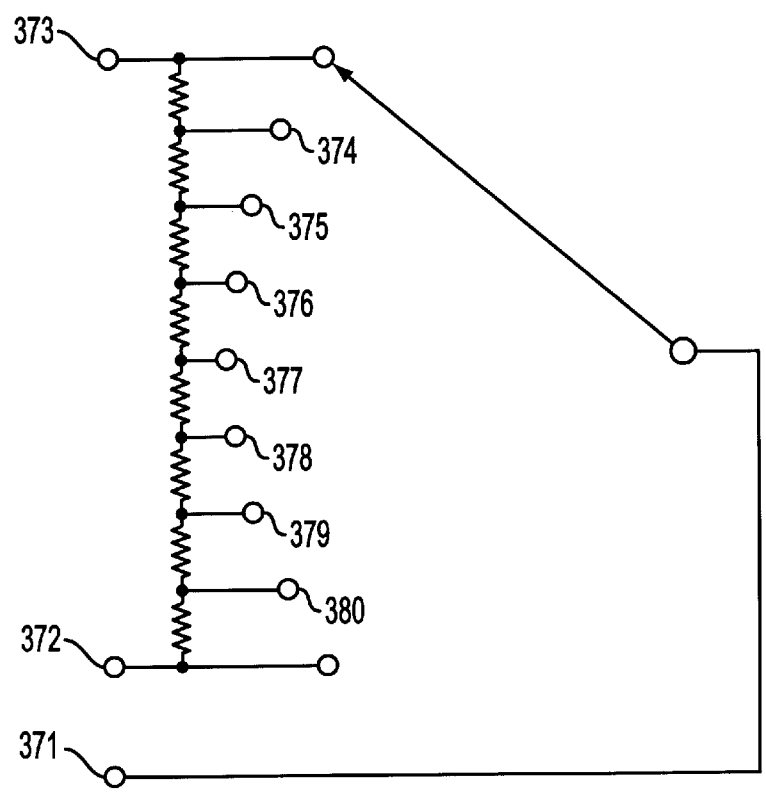
FIG. 24 is an equivalent electrical circuit for an electrical operating device that employs the contact base plate shown in FIGS. 22 and 23.

FIG. 24 is a diagram depicting the equivalent electric circuit of the position sensor 309 for the front section. The interconnection state of the electric contact 371 and the electric contacts 372 through 380 is switched depending on the rotational position of the brush 350. The shift position of the rear change gear device can be identified because the resistance between the electric contacts 371 and 372 or between the electric contacts 371 and 373 varies in steps depending on which of the electric contacts 372 through 380 is connected to the electric contact 371.

The position sensor 309 for the rear section functions as a potentiometer that allows resistance to vary in steps. For example, a prescribed voltage is applied between the electric contacts 372 and 373, and the voltage between the electric contacts 371 and 372, making it possible to identify the shift position on the basis of this detected voltage. An A/D converter should be used for converting the detected voltage to a digital value indicating the shift position. It is preferable for the shift position to be detected using such a circuit because the rear change gear device has relatively many shift stages. In this case, there are nine shift stages.

Thus, providing the shifting device 301 with the sensor 309 as an identification signal output means allows the shift positions and other attributes of the change gear device to be readily identifiable, while displaying the results on a bicycle display device allows the rider to verify the shift position safely and easily. In addition, a position sensor designed for the front section and provided with only a few shift stages can directly monitor the connection on/off state of the electric contacts, and a position sensor designed for the rear section and provided with a large number of shift stages can monitor the shift position on the basis of changes in the resistance between the electric contacts, making it possible to perform optimum detection in a cost-effective manner in accordance with the number of shift stages available in each case.

While the above is a description of various embodiments of the present invention, further modifications may be employed without departing from the spirit and scope of the present invention. For example, the size, shape, location or orientation of the various components may be changed as desired. The functions of one element may be performed by two, and vice versa.

Although the switching means described above outputs upshift or downshift electrical signals to a shifting mechanism with the aid of switching operations, it is also possible, rather than to merely output switching signals, to equip the switching unit attached to the handle with an CRT or other display and to provide a mode switch for switching among gear indicators or among display modes such as speed and wheel rpm.

Although the above-described embodiments involved the use of mechanical contacts, the above description also suggests that the options are not limited to such mechanical contacts and include conventional noncontact switching means in which detection is accomplished using magnetism, impedance, light, or the like.

Thus, the scope of the invention should not be limited by the specific structures disclosed. Instead, the true scope of the invention should be determined by the following claims.

What is claimed is:

1. An electrical operating device for a bicycle comprising:
 a brake control device adapted to be mounted to a handlebar of the bicycle, wherein the brake control device includes:
  a brake control device housing for attachment to the bicycle;
  a first operating lever pivotably mounted to the brake control device housing, wherein the first operating lever moves along a first path for controlling the operation of a brake; and
 a switching device disposed in the brake control device housing, wherein the switching device outputs electrical signals in response to movement of the switching device along a second path different from the first path.

2. The electrical operating device according to claim 1 wherein the first operating lever forms part of the switching device and is structured for moving along the second path.

3. The electrical operating device according to claim 2 wherein the first operating lever is coupled to a brake rotary body that is mounted to the brake control device for rotation around a first axis, wherein rotation of the brake rotary body around the first axis controls the operation of the brake.

4. The electrical operating device according to claim 3 wherein the first operating lever is mounted to the brake rotary body for movement along the second path.

5. The electrical operating device according to claim 2 wherein the first operating lever rotates around a first axis for moving along the first path, wherein the first operating lever rotates around a second axis for moving along the second path, and wherein the first axis is substantially perpendicular to the second axis.

6. The electrical operating device according to claim 2 further comprising a biasing mechanism for biasing the first operating lever to an initial position along the second path.

7. The electrical operating device according to claim 1 wherein the switching device includes a change gear device that is mounted integrally with the brake control device.

8. The electrical operating device according to claim 7 wherein the change gear device includes a rotating first member that rotates relative to a second member.

9. An electrical operating device for a bicycle comprising:
 a brake control device adapted to be mounted to a handlebar of the bicycle, wherein the brake control device includes a first operating lever that moves alone a first path for controlling the operation of a brake;
 a switching device integrated with the brake control device that outputs electrical signals in response to movement of the switching device along a second path different from the first path;
 wherein the first operating lever forms part of the switching device and is structured for moving along the second path; and wherein the first operating lever is coupled to a brake rotary body that is mounted to the brake control device for rotation around a first axis, wherein rotation of the brake rotary body around the first axis controls the operation of the brake;

wherein the first operating lever is mounted to the brake rotary body for movement along the second path; and wherein the switching device further comprises:

a switching mechanism mounted to the brake rotary body for rotation around a second axis in response to movement of the first operating lever along the second path;

a first first side electrical contact coupled to one of the brake rotary body and the switching mechanism;

a first second side electrical contact coupled to the other one of the brake rotary body and the switching mechanism for selectively contacting the first first side electrical contact in response to rotation of the switching mechanism around the second axis; and a second second side electrical contact coupled to the other one of the brake rotary body and the switching mechanism for selectively contacting the first first side electrical contact in response to rotation of the switching mechanism around the second axis.

10. The electrical operating device according to claim 9 wherein the switching device further comprises a positioning element coupled to the other one of the brake rotary body and the switching mechanism between the first second side electrical contact and the second second side electrical contact for selectively contacting the first first side electrical contact in response to rotation of the switching mechanism around the second axis.

11. The electrical operating device according to claim 10 wherein the first first side electrical contact is coupled to the brake rotary body, and wherein the first second side electrical contact, the second second side electrical contact, and the positioning element are couple to the switching mechanism.

12. The electrical operating device according to claim 11 further comprising a biasing mechanism for biasing the first operating lever to a position in the second path where the positioning element contacts the first first side electrical contact.

13. The electrical operating device according to claim 12 wherein the first axis intersects the second axis.

14. The electrical operating device according to claim 13 wherein the first axis is substantially perpendicular to the second axis.

15. The electrical operating device according to claim 9 wherein the switching device outputs a different electrical signal when the first side electrical contact contacts each of the first second side electrical contact and the second second side electrical contact.

16. The electrical operating device according to claim 15 wherein the first second side electrical contact and second second side electrical contact comprise a resistive path.

17. An electrical operating device for a bicycle comprising:

a brake control device adapted to be mounted to a handlebar of the bicycle, wherein the brake control device includes a first operating lever that moves along a first path for controlling the operation of a brake;

a switching device integrated with the brake control device that outputs electrical signals in response to movement of the switching device along a second path different from the first path;

wherein the first operating lever forms part of the switching device and is structured for moving along the second path; and wherein the first operating lever is coupled to a brake rotary body that is mounted to the brake control device for rotation around a first axis, wherein rotation of the brake rotary body around the first axis controls the operation of the brake;

wherein the first operating lever is mounted to the brake rotary body for movement along the second path; and wherein the switching device further comprises:

a switching mechanism mounted to the brake rotary body for rotation around a second axis in response to movement of the first operating lever along the second path;

a first first side electrical contact coupled to one of the brake rotary body and the switching mechanism;

a second first side electrical contact coupled to the one of the brake rotary body and the switching mechanism;

a first second side electrical contact coupled to the other one of the brake rotary body and the switching mechanism for selectively contacting the first first side electrical contact in response to rotation of the switching mechanism around the second axis; and a second second side electrical contact coupled to the other one of the brake rotary body and the switching mechanism for selectively contacting the second first side electrical contact in response to rotation of the switching mechanism around the second axis.

18. The electrical operating device according to claim 17 wherein the switching mechanism comprises:

a first switching rotary body for rotating around the second axis; and a second switching rotary body for rotating around the second axis independently of the first switching rotary body.

19. The electrical operating device according to claim 18 wherein the first operating lever is coupled to the first switching rotary body for rotating the first switching rotary body around the second axis.

20. The electrical operating device according to claim 19 further comprising a second operating member coupled to the second switching rotary body for rotating the second switching rotary body around the second axis.

21. The electrical operating device according to claim 20 wherein the second operating member comprises a second operating lever.

22. The electrical operating device according to claim 19 wherein the switching device further comprises:

a first positioning element coupled to the other one of the brake rotary body and the switching mechanism for selectively contacting the first first side electrical contact in response to rotation of the switching mechanism around the second axis; and a second positioning element coupled to the other one of the brake rotary body and the switching mechanism for selectively contacting the second first side electrical contact in response to rotation of the switching mechanism around the second axis.

23. The electrical operating device according to claim 22 wherein the first first side electrical contact and the second first side electrical contact are coupled to the brake rotary body, wherein the first second side electrical contact and the first positioning element are coupled to the first switching rotary body, and wherein the second second side electrical contact and the second positioning element are coupled to the second switching rotary body.

24. The electrical operating device according to claim 23 further comprising:

a first biasing mechanism for biasing the first operating lever to a position in the second path where the first positioning element contacts the first first side electrical contact; and a second biasing mechanism for biasing the second operating lever to a position in the second path where the second positioning element contacts the second first side electrical contact.

25. The electrical operating device according to claim 24 wherein the first axis intersects the second axis.

26. The electrical operating device according to claim 25 wherein the first axis is substantially perpendicular to the second axis.

27. The electrical operating device according to claim 17 wherein the switching mechanism comprises a switching rotary body that rotates around the second axis, and further comprising a first clutch disposed between the first operating lever and the switching rotary body for causing rotation of the switching rotary body in a first direction in response to movement of the first operating lever along the second path.

28. The electrical operating device according to claim 27 further comprising:

a second operating member for movement along a third path; and a second clutch disposed between the second operating member and the switching rotary body for causing rotation of the switching rotary body in a second direction opposite the first direction in response to movement of the second operating member along the third path.

29. The electrical operating device according to claim 28 wherein the second opera zing member comprises a second operating lever.

30. The electrical operating device according to claim 29 wherein the first first side electrical contact and the second first side electrical contact are coupled to the switching rotary body, and further comprising:

a plurality of the first second side electrical contacts extending in a circumferential direction on the brake rotary body; and a plurality of the second second side electrical contacts extending in a circumferential direction on the brake rotary body radially outwardly from the plurality of first second side electrical contacts.

31. The electrical operating device according to claim 30 further comprising:

a first biasing mechanism for biasing the first operating lever to an initial position; and a second biasing mechanism for biasing the second operating lever to an initial position.

32. The electrical operating device according to claim 31 wherein the first axis is substantially perpendicular to the second axis.

33. The electrical operating device according to claim 31 wherein the first axis intersects the second axis.

34. An electrical operating device for a bicycle comprising:

a brake control device adapted to be mounted to a handlebar of the bicycle, wherein the brake control device includes a first operating member that moves along a first path for controlling the operation of a brake;

a switching device integrated with the brake control device that outputs electrical signals in response to movement of the switching device along a second path different from the first path;

wherein the switching device includes a change year device that is mounted integrally with the brake control device;

wherein the change gear device includes a rotating first member that rotates relative to a second member;

wherein the switching device further comprises:

a first first side electrical contact coupled to one of the first member and the second member;

a first second side electrical contact coupled to the other one of the first member and the second member for selectively contacting the first first side electrical contact in response to rotation of the first member relative to the second member; and a second second side electrical contact coupled to the other one of the first member and the second member for selectively contacting the first first side electrical contact in response to rotation of the first member relative to the second member.

35. The electrical operating device according to claim 34 wherein the switching device outputs a different electrical signal when the first side electrical contact contacts each of the first second side electrical contact and the second second side electrical contact.

36. The electrical operating device according to claim 35 wherein the first second side electrical contact and second second side electrical contact comprise a resistive path.

37. The electrical operating device according to claim 35 wherein the first operating member comprises a first operating lever that rotates around a first axis for moving along the first path, and wherein rotation of the first operating lever around the first axis controls the operation of the brake.

38. The electrical operating device according to claim 37 wherein the switching device further comprises a second operating lever coupled to the first member, wherein the second operating lever moves along the second path for rotating the first member around a second axis.

39. The electrical operating device according to claim 38 wherein the first member rotate integrally with a winding drum for a cable.

40. The electrical operating device according to claim 38 wherein the first axis is substantially perpendicular to the second axis.

41. The electrical operating device according to claim 38 further comprising:

a first biasing mechanism for biasing the first operating lever to an initial position along the first path; and a second biasing mechanism for biasing the second operating lever to an initial position along the second path.

* * * * *